United States Patent
Kulkarni et al.

(10) Patent No.: US 10,628,172 B2
(45) Date of Patent: Apr. 21, 2020

(54) SYSTEMS AND METHODS FOR USING DISTRIBUTED UNIVERSAL SERIAL BUS (USB) HOST DRIVERS

(71) Applicant: QUALCOMM Incorporated, San Diego, CA (US)

(72) Inventors: Ameya Kulkarni, San Diego, CA (US); Andrew Cheung, Escondido, CA (US); Jay Yu Jae Choi, San Diego, CA (US); Daniel Hyongkyu Kim, San Diego, CA (US); Hemant Kumar, San Diego, CA (US); Vamsi Krishna Samavedam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 163 days.

(21) Appl. No.: 15/631,088

(22) Filed: Jun. 23, 2017

(65) Prior Publication Data

US 2017/0371681 A1 Dec. 28, 2017

Related U.S. Application Data

(60) Provisional application No. 62/355,279, filed on Jun. 27, 2016, provisional application No. 62/514,211, filed on Jun. 2, 2017.

(51) Int. Cl.
*G06F 9/44* (2018.01)
*G06F 9/4401* (2018.01)
(Continued)

(52) U.S. Cl.
CPC .......... *G06F 9/4411* (2013.01); *G06F 1/3215* (2013.01); *G06F 1/3253* (2013.01);
(Continued)

(58) Field of Classification Search
CPC ........ G06F 13/38; G06F 13/382; G06F 3/016; G06F 3/16; G06F 3/165; G06F 9/4411
See application file for complete search history.

(56) References Cited

U.S. PATENT DOCUMENTS 6,577,337 B1  6/2003  Kang
7,472,217 B2  12/2008 Lou et al.
(Continued)

FOREIGN PATENT DOCUMENTS

EP  2423806 A1   2/2012
EP  2530599 A1  12/2012

OTHER PUBLICATIONS

Author Unknown, "Audio subsystem power management for modem standby platforms," Microsoft Corporation, Retrieved from Internet on Apr. 16, 2017, https://msdn.microsoft.com/en-us/windows/hardware/commercialize/...es/audio-subsystem-power-management-for-modern-standby-platforms, 18 pages.
(Continued)

*Primary Examiner* — Tuan C Dao
(74) *Attorney, Agent, or Firm* — Withrow & Terranova, PLLC

(57) ABSTRACT

Systems and methods for using distributed Universal Serial Bus (USB) host drivers are disclosed. In one aspect, USB packet processing that was historically done on an application processor is moved to a distributed USB driver running in parallel on a low-power processor such as a digital signal processor (DSP). While a DSP is particularly contemplated, other processors may also be used. Further, a communication path is provided from the low-power processor to USB hardware that bypasses the application processor. Bypassing the application processor in this fashion allows the application processor to remain in a sleep mode for longer periods of time instead of processing digital data received from the low-power processor or the USB hardware. Further, by
(Continued)

bypassing the application processor, latency is reduced, which improves the listener experience.

8 Claims, 22 Drawing Sheets

(51) Int. Cl.
| | |
|---|---|
| G06F 1/3234 | (2019.01) |
| G06F 1/3293 | (2019.01) |
| G06F 13/38 | (2006.01) |
| G06F 1/3215 | (2019.01) |
| G06F 3/16 | (2006.01) |
| H04L 29/06 | (2006.01) |

(52) U.S. Cl.
CPC ............. *G06F 1/3293* (2013.01); *G06F 3/16* (2013.01); *G06F 3/162* (2013.01); *G06F 3/165* (2013.01); *G06F 9/44* (2013.01); *G06F 13/38* (2013.01); *G06F 13/382* (2013.01); *H04L 29/06183* (2013.01); *Y02D 10/122* (2018.01); *Y02D 10/151* (2018.01)

(56) References Cited

U.S. PATENT DOCUMENTS

| | | | |
|---|---|---|---|
| 8,429,299 B2 | 4/2013 | Chan et al. | |
| 8,521,934 B1 | 8/2013 | Ni | |
| 8,886,699 B2 | 11/2014 | Hickey et al. | |
| 9,053,246 B2 | 6/2015 | Moore | |
| 9,684,915 B1 | 6/2017 | Cronin et al. | |
| 2002/0069308 A1* | 6/2002 | Jones ................ | H04N 21/4183 710/5 |
| 2003/0107998 A1* | 6/2003 | Mowery ............... | H04W 28/10 370/252 |
| 2004/0161115 A1* | 8/2004 | Loose .................... | G07F 17/32 381/20 |
| 2006/0010264 A1* | 1/2006 | Rader ................ | B65H 35/0013 710/23 |
| 2006/0182427 A1 | 8/2006 | Chen et al. | |
| 2006/0196348 A1 | 9/2006 | Cummings | |
| 2007/0094525 A1 | 4/2007 | Uguen et al. | |
| 2007/0152076 A1 | 7/2007 | Chiang et al. | |
| 2007/0168262 A1* | 7/2007 | Morotomi ............. | G06Q 30/06 705/26.1 |
| 2008/0104422 A1* | 5/2008 | Mullis ..................... | G06F 1/266 713/300 |
| 2008/0229335 A1 | 9/2008 | Robbin et al. | |
| 2009/0111524 A1* | 4/2009 | Basaralu ............... | G06F 1/3209 455/559 |
| 2010/0188550 A1* | 7/2010 | Ichieda ............. | H04N 1/00283 348/333.01 |
| 2011/0090883 A1* | 4/2011 | Tanaka ................... | G06F 1/3203 370/338 |
| 2011/0173351 A1 | 7/2011 | Aull et al. | |
| 2012/0159220 A1* | 6/2012 | Winkler ................ | H02J 7/0068 713/323 |
| 2012/0314650 A1* | 12/2012 | Medapalli ........... | H04W 52/028 370/328 |
| 2013/0007324 A1 | 1/2013 | Moore et al. | |
| 2013/0072260 A1 | 3/2013 | Nair et al. | |
| 2013/0179671 A1* | 7/2013 | Tsai ........................ | G06F 13/20 713/2 |
| 2013/0223635 A1* | 8/2013 | Singer .................. | H04R 1/1041 381/56 |
| 2013/0282951 A1* | 10/2013 | Kuo ....................... | G06F 21/575 711/102 |
| 2014/0082142 A1* | 3/2014 | Geffin ................... | G06F 13/385 709/217 |
| 2014/0201399 A1 | 7/2014 | Brabenac | |
| 2014/0222436 A1* | 8/2014 | Binder .................... | G06F 3/167 704/275 |
| 2015/0264513 A1* | 9/2015 | Ryazanov ............... | G06F 3/162 710/70 |
| 2015/0312475 A1 | 10/2015 | Dinev | |
| 2015/0346794 A1* | 12/2015 | Sakashita ................ | G06F 1/266 713/310 |
| 2016/0004287 A1* | 1/2016 | Qiu ........................ | H01R 24/62 713/300 |
| 2016/0132369 A1 | 5/2016 | Lee et al. | |
| 2016/0132840 A1 | 5/2016 | Bowles et al. | |
| 2016/0378465 A1 | 12/2016 | Venkatesh et al. | |
| 2016/0381191 A1* | 12/2016 | Marque ..................... | G06F 9/54 709/226 |
| 2017/0373881 A1 | 12/2017 | Yu et al. | |
| 2018/0070840 A1 | 3/2018 | Cronin et al. | |
| 2018/0115130 A1 | 4/2018 | Truluck et al. | |
| 2018/0150118 A1 | 5/2018 | Kalam | |
| 2018/0181364 A1 | 6/2018 | Gupta et al. | |

OTHER PUBLICATIONS

Castor-Perry, Kendall, "Programmable Clock Generation and Synchronization for USB Audio Systems," UK 24th Conference: The Ins & Outs of Audio, Jun. 2011, AES, 10 pages.

Second Written Opinion for PCT/US2017039201, dated May 16, 2018, 7 pages.

International Preliminary Report on Patentability for PCT/US2017/039201, dated Sep. 26, 2018, 7 pages.

Huang-Bing, Gao et al., "The Deisgn of a Network Video Transmission System Based on DSP and USB," 2010 2nd International Asia Conference on Informatics in Control, Automation and Robotics, 2010, IEEE, pp. 121-123.

International Search Report and Written Opinion for PCT/US2017/039201, dated Sep. 22, 2017, 16 pages.

International Search Report and Written Opinion for PCT/US2019/014511, dated Apr. 5, 2019, 16 pages.

* cited by examiner

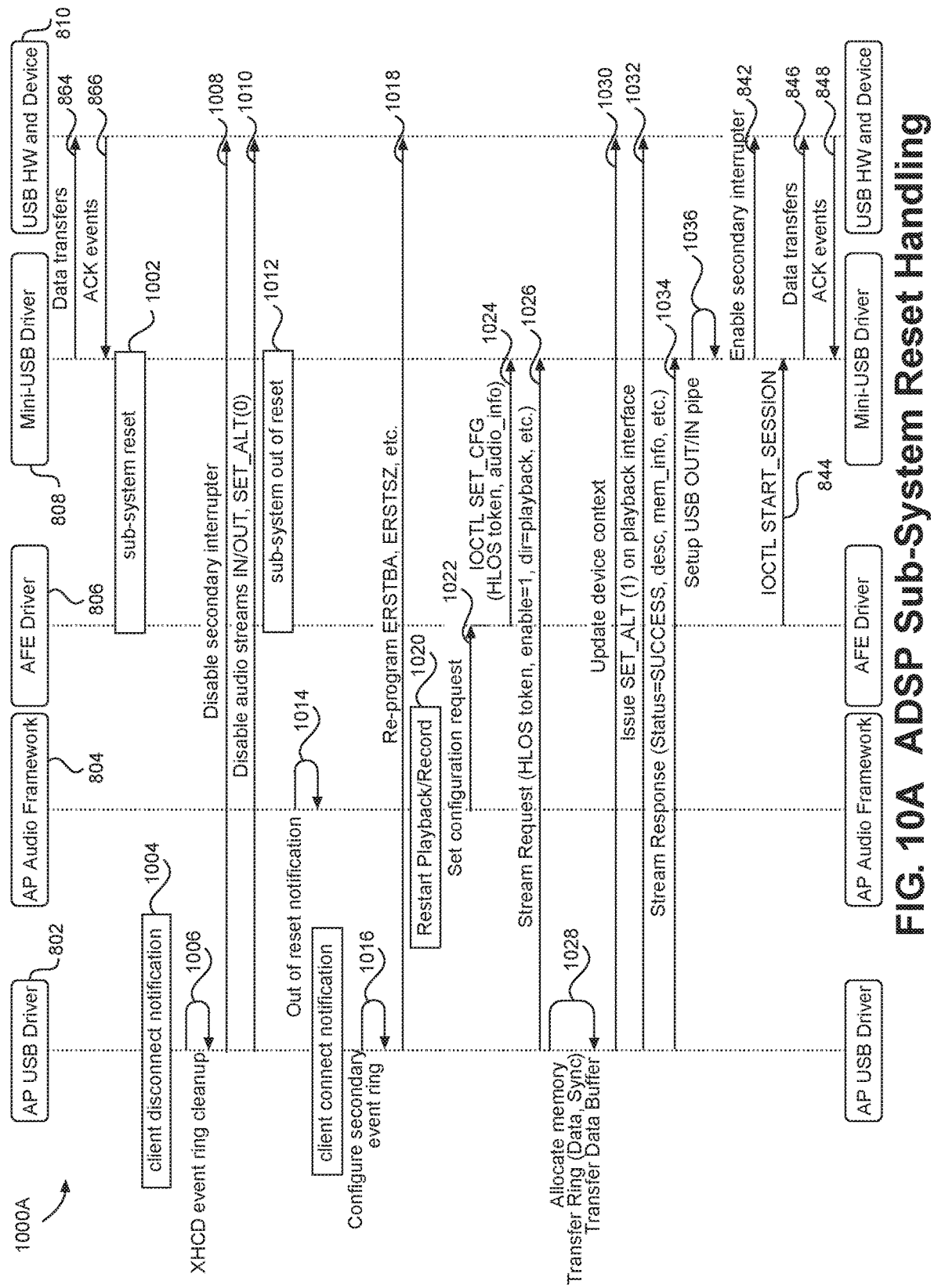
FIG. 10A ADSP Sub-System Reset Handling

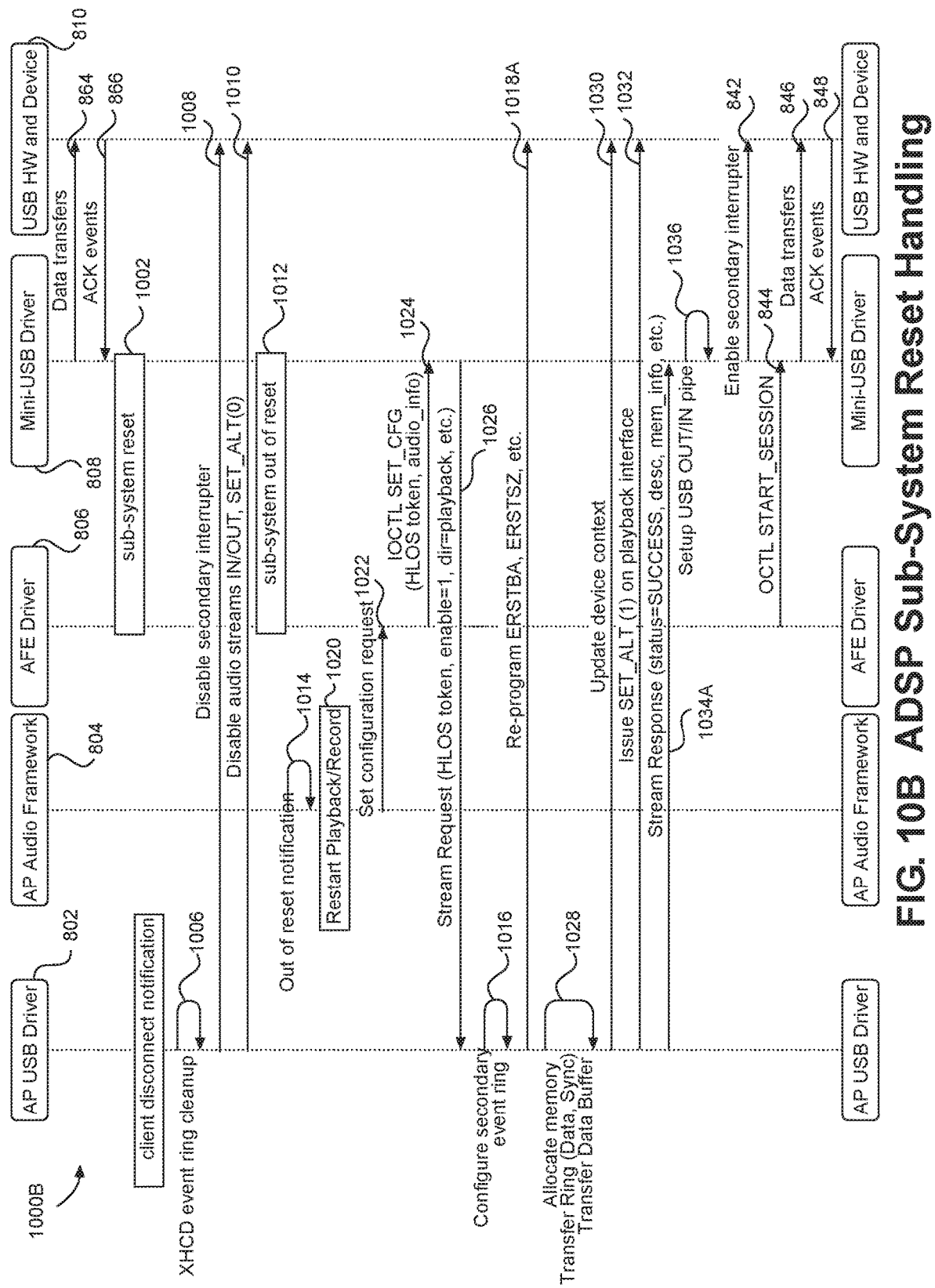
FIG. 10B ADSP Sub-System Reset Handling

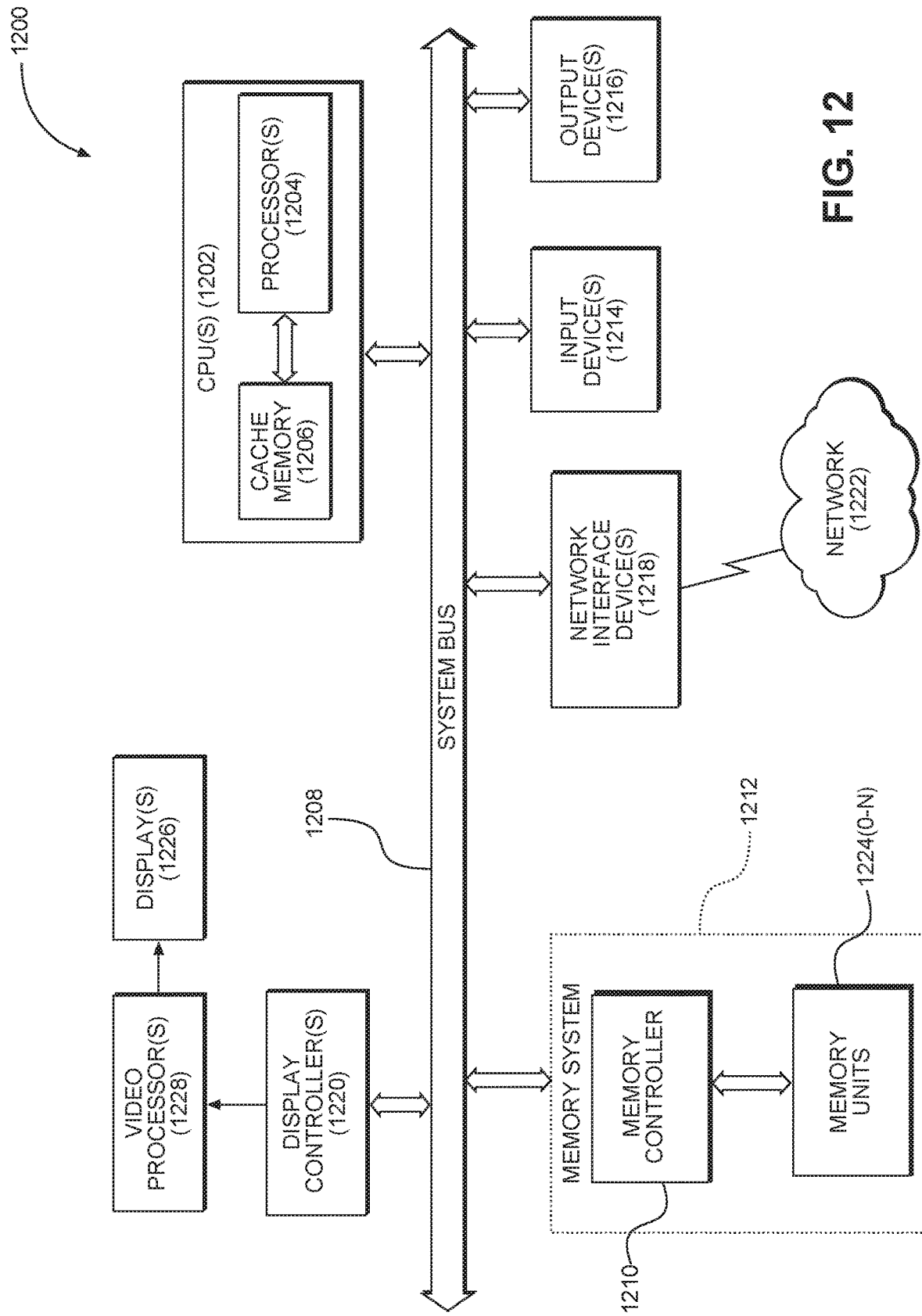

SYSTEMS AND METHODS FOR USING DISTRIBUTED UNIVERSAL SERIAL BUS (USB) HOST DRIVERS

PRIORITY APPLICATIONS

The present application claims priority to and the benefit of U.S. Provisional Patent Application Ser. No. 62/355,279 filed on Jun. 27, 2016 and entitled "METHODS TO REDUCE POWER CONSUMPTION AND LATENCY FOR UNIVERSAL SERIAL BUS (USB) DIGITAL AUDIO PERIPHERALS BY USING DISTRIBUTED USB HOST DRIVERS," the contents of which is incorporated herein by reference in its entirety.

The present application also claims priority to and the benefit of U.S. Provisional Patent Application Ser. No. 62/514,211, filed on Jun. 2, 2017 and entitled "SYSTEMS AND METHODS FOR USING DISTRIBUTED UNIVERSAL SERIAL (USB) HOST DRIVERS," the contents of which is incorporated herein by reference in its entirety.

BACKGROUND

I. Field of the Disclosure

The technology of the disclosure relates generally to managing Universal Serial Bus (USB) peripherals e.g., USB Digital Headset.

II. Background

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

As mobile communication devices have evolved into multimedia centers, so too have the types of peripherals that are capable of interoperating with mobile communication devices. Remote displays, remote speakers, headsets, headsets with microphones, and the like have all been adapted for use with mobile communication devices. In some instances the peripheral communicates with the mobile communication device wirelessly such as through a BLUETOOTH connection. In other instances, particularly in audio use cases, a wire may be used to connect the mobile communication device to the peripheral. One common connection point for such audio wires is a 3.5 millimeter (mm) audio jack.

Conflicting data in the mobile communication industry indicates variously that consumers prefer smaller or larger displays on mobile communication devices. Responding to the belief that lighter mobile communications are more desirable, there remains a trend to make mobile communication devices thinner. As the devices become thinner, the space required to support a 3.5 mm audio jack becomes a limiting factor. Accordingly, there has been a recent trend to use the new Universal Serial Bus (USB) Type-C connector for any digital peripheral including any audio peripheral. This trend is the result of the fact that the form factor for a Type-C connector has a dimension smaller than 3.5 mm and thus allows further thinning of mobile communication devices. Further, USB Type-C cables support high bandwidth digital delivery, which is generally held to be of higher quality than older analog technology associated with the 3.5 mm audio jack.

While USB Type-C audio peripherals may improve user experience by providing better audio quality, it has been noted that USB in general consumes more power from mobile communication devices than an analog audio jack. Regardless of what size the mobile communication device is, there is a uniform desire to decrease power consumption so as to extend battery life. Accordingly, there is a need to improve power consumption profiles for mobile communication devices when a digital USB peripheral (e.g., digital audio USB headset device with Type-C connector) is connected.

SUMMARY OF THE DISCLOSURE

Aspects disclosed in the detailed description include systems and methods for using distributed Universal Serial Bus (USB) host drivers. In an exemplary aspect, USB packet processing that was historically done on an application processor is moved to a distributed USB driver running in parallel on a low-power processor such as a digital signal processor (DSP). While a DSP is particularly contemplated, other processors may also be used. Further, a communication path is provided from the low power-processor to USB hardware that bypasses the application processor. Bypassing the application processor in this fashion allows the application processor to remain in a sleep mode for longer periods of time instead of processing digital data received from the low-power processor or the USB hardware. Further, by bypassing the application processor, latency is reduced, which improves the listener experience. While USB is particularly contemplated, the wired connection between the USB hardware and the peripheral may be a proprietary element that is capable of carrying USB signals.

In this regard in one aspect, a method of controlling audio streams in a USB system is disclosed. The method includes establishing a connection between an application processor and an external digital USB peripheral. The method also includes allowing an audio DSP to pass audio packets to USB hardware through a system bus. The method also includes passing the audio packets from the USB hardware to the external digital USB peripheral.

In another aspect, a system on a chip is disclosed. The system on a chip includes a system bus. The system on a chip also includes USB hardware. The system on a chip also includes a USB connector communicatively coupled to the USB hardware and configured to couple to an external digital USB peripheral. The system on a chip also includes an application processor communicatively coupled to the USB hardware through the system bus. The application processor includes a USB host driver. The system on a chip also includes an audio DSP communicatively coupled to the USB hardware through the system bus. The audio DSP includes a second USB driver. The application processor is configured to enumerate and set up a USB endpoint through the USB hardware and the USB connector and pass data about the USB endpoint to the audio DSP such that the audio DSP may pass audio packets to the USB hardware.

In another aspect, a method of handling a USB audio device is disclosed. The method includes distributing a USB driver between an application processor and an audio DSP. The method also includes enumerating configuring USB endpoints through the application processor. The method also includes controlling an audio stream of data packets with the audio DSP.

In another aspect, a method of saving power in a system on a chip is disclosed. The method includes passing a USB connection from an application processor to an audio DSP in a system on a chip. The method also includes, while the audio DSP passes audio packets to USB hardware, voting to put the application processor into a low-power mode.

In another aspect, a method of controlling a USB endpoint is disclosed. The method includes enumerating a USB endpoint with a USB driver on an application processor. The method also includes receiving a request from a second USB driver on an audio DSP to enable or disable an audio data stream. The method also includes, responsive to the request, enabling or disabling a selected audio interface using control endpoints and the USB driver on the application processor. The method also includes providing from the USB driver on the application processor to the second USB driver on the audio DSP a device descriptor. The method also includes, at the second USB driver, using the device descriptor passed from the USB driver to perform data transfers.

In another aspect, a method for interprocessor communication between an application processor USB driver and an audio DSP USB driver is disclosed. The method includes sending from an application processor USB driver to an audio DSP USB driver, information selected from the group consisting of: a slot identifier, a device descriptor, an audio data and synchronization endpoint descriptor, an audio interface specific descriptor, and an interrupt number.

In another aspect, a method for controlling communication to a USB endpoint is disclosed. The method includes determining first packets are encoded or decoded at an application processor. Responsive to the determining of the first packets, the method includes using an application processor USB driver to service audio streams associated with the first packets. The method also includes determining second packets are encoded or decoded at an audio DSP. Responsive to the determining of the second packets, the method also includes using an audio DSP USB driver to service audio streams associated with the second packets.

In another aspect, a method of controlling multimedia streams in a USB system is disclosed. The method includes establishing a connection between an application processor and an external digital USB peripheral. The method also includes allowing a second processor to pass multimedia packets to USB hardware through a system bus. The method also includes passing the multimedia packets from the USB hardware to the external digital USB peripheral.

In another aspect, a system on a chip (SoC) is disclosed. The SoC includes a system bus. The SoC also includes USB hardware. The SoC also includes a USB connector communicatively coupled to the USB hardware and configured to couple to an external digital USB peripheral. The SoC also includes an application processor communicatively coupled to the USB hardware through the system bus. The application processor includes a USB host driver. The SoC also includes a second processor communicatively coupled to the USB hardware through the system bus. The second processor includes a second USB driver. The application processor is configured to enumerate and set up a USB endpoint through the USB hardware and the USB connector and pass data about the USB endpoint to the second processor such that the second processor may pass digital packets to the USB hardware.

In another aspect, a method of saving power in an SoC is disclosed. The method includes passing a USB connection from an application processor to a second processor in an SoC. The method also includes, while the second processor passes multimedia packets to USB hardware, voting to put the application processor into a low-power mode.

In another aspect, a method of controlling a USB endpoint is disclosed. The method includes enumerating a USB endpoint with a USB driver on an application processor. The method also includes receiving a request from a second USB driver on a second processor to enable or disable a multimedia data stream. The method also includes, responsive to the request, enabling or disabling a selected multimedia interface using control endpoints and the USB driver on the application processor. The method also includes providing, from the USB driver on the application processor to the second USB driver on the second processor, a device descriptor. The method also includes, at the second USB driver, using the device descriptor passed from the USB driver to perform data transfers.

In another aspect, a method for interprocessor communication between an application processor USB driver and a mini-USB driver is disclosed. The method includes sending, from an application processor USB driver to a mini-USB driver on low power processor (such as Audio DSP), information selected from the group consisting of a slot identifier, a device descriptor, an audio data and synchronization endpoint descriptor, an audio interface-specific descriptor, and an interrupter number.

In another aspect, a method for controlling communication to a USB endpoint is disclosed. The method includes determining first packets are encoded or decoded at an application processor, and responsive to the determining of the first packets, using an application processor USB driver to service digital data streams associated with the first packets. The method also includes determining second packets are encoded or decoded at a second processor, and responsive to the determining of the second packets, using a mini-USB driver to service digital data streams associated with the second packets.

In another aspect, a method for controlling packet routing between processors in a USB system is disclosed. The method includes determining a use case for a packet stream destined for or originating from an external digital USB peripheral. The method also includes determining a latency requirement based on the use case. The method also includes determining whether to route the packet stream through an application processor or a second processor to meet the latency requirement.

BRIEF DESCRIPTION OF THE FIGURES

FIGS. 10A and 10B represent signal flow diagrams for a sub-system reset of a low-power processor;

FIG. 12 is a block diagram of an exemplary processor-based system such as the mobile communication device of FIG. 1.

DETAILED DESCRIPTION

Figure 1:
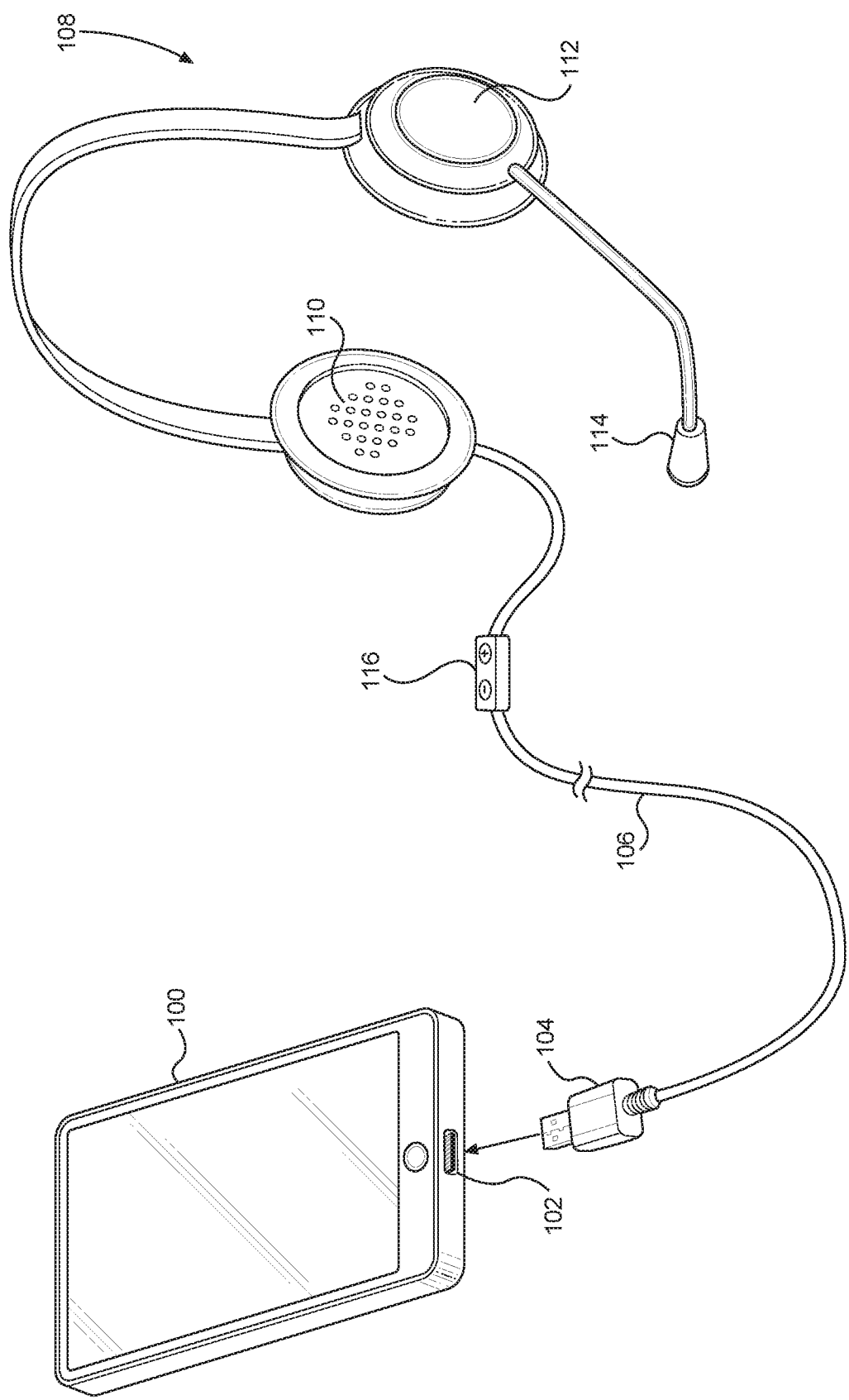
FIG. 1 is a simplified perspective view of a mobile communication device coupled to an audio peripheral in which exemplary aspects of the present disclosure may operate to reduce power consumption and latency.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for using distributed Universal Serial Bus (USB) host drivers. In an exemplary aspect, USB packet processing that was historically done on an application processor is moved to a distributed USB driver running in parallel on a low-power processor such as a digital signal processor (DSP). While a DSP is particularly contemplated, other processors may also be used. Further, a communication path is provided from the low-power processor to USB hardware that bypasses the application processor. Bypassing the application processor in this fashion allows the application processor to remain in a sleep mode for longer periods of time instead of processing digital data received from the low-power processor or the USB hardware. Further, by bypassing the application processor, latency is reduced, which improves the listener experience. While USB is particularly contemplated, the wired connection between the USB hardware and the peripheral may be a proprietary element that is capable of carrying USB signals.

Before addressing exemplary aspects of the present disclosure, an additional overview of relevant design criteria is provided. When shifting a USB host driver to a distributed model where a portion of the USB host driver operates on a second processor, relevant criteria for selecting the second processor includes whether the second processor is capable of communicating with USB hardware and whether the second processor consumes less power than the application processor. In general, the present disclosure contemplates use in an audio or multimedia environment, but the present disclosure is not limited to just those situations, and other digital USB environments may benefit from aspects of the present disclosure. In the interests of simplicity, an audio environment will be used to illustrate exemplary aspects of the present disclosure with the understanding that the teachings may be applied to multimedia or other digital USB environments. Turning to the audio environment, it should be appreciated that there are at least two types of processing done on audio packets. A first type of processing is audio processing at an audio driver. Audio processing is where packets are encoded, decoded, and signals are processed. A second type of processing is USB audio packet processing, which is typically done at a USB driver. USB audio packet processing is where packets are prepared, packaged, and queued on to the USB hardware. As used herein, when the present disclosure refers to audio processing, such reference is to USB audio packet processing (i.e., the second type of processing). It should further be appreciated that while the discussion below focuses on a Type-C USB connection, the present disclosure is not so limited. The present disclosure is applicable to any connector which uses a digital audio USB protocol such as, but not limited to, the following receptacles: Type-A, micro-A, and proprietary versions of same such as LIGHTNING™; and the following connectors: Type-B, micro-B, and proprietary versions of the same such as LIGHTNING™, and cables that are used to connect such USB receptacles/connectors to an external digital USB device. Thus, a proprietary cable with proprietary connectors inserted into a proprietary receptacle that carries digital USB signals may still benefit from exemplary aspects of the present disclosure.

In this regard, FIG. 1 is a simplified perspective view of a mobile communication device 100 with a Type-C USB receptacle 102 configured to couple to a Type-C USB connector 104 on a USB cable 106. As noted above, the present disclosure is not limited to Type-C receptacles, connectors, and cables, but such are used to illustrate exemplary aspects of the present disclosure. At a distal end of the USB cable 106 is a digital audio headset 108 having plural speakers 110 in headphones 112 and a microphone 114. Digital audio signals may pass between the mobile communication device 100 and the digital audio headset 108 through the USB cable 106. The USB cable 106 may further include an audio control unit 116 which may allow for volume control through +/− buttons and/or play/pause/stop, mute, unmute functionality through additional input buttons (not illustrated). Again, while a digital audio headset 108 is illustrated, the present disclosure may also benefit other external digital USB devices.

Figure 2:
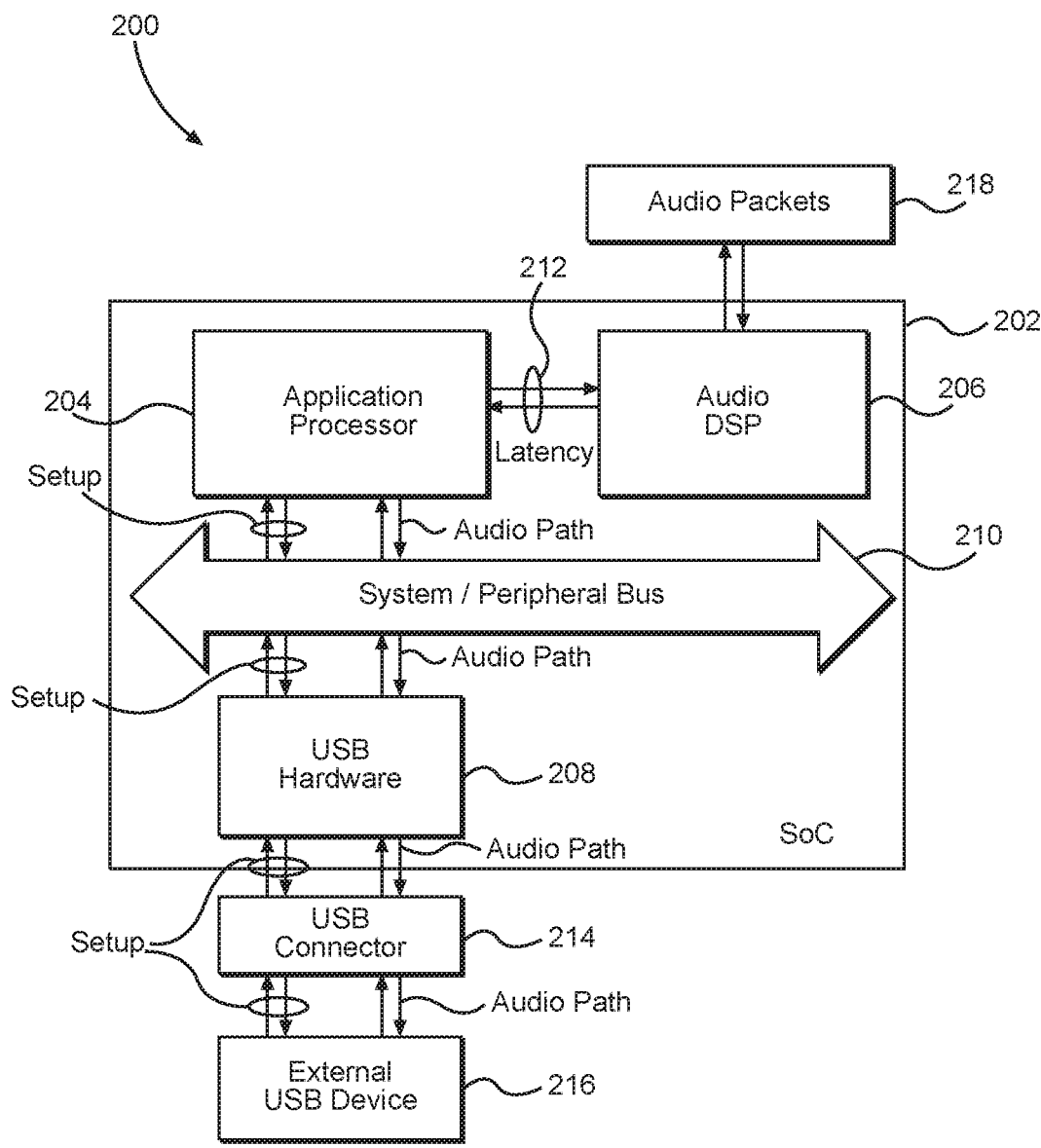
FIG. 2 is a simplified block diagram of an exemplary conventional Universal Serial Bus (USB) communication path for a mobile communication device and an external peripheral.

In conventional systems, digital data from a headset is processed by an application processor before being passed to USB hardware. Such application processor consumes relatively large amounts of power and thus drains a battery of such a device quickly. This situation is illustrated in FIG. 2. Specifically, FIG. 2 illustrates a mobile communication device 200 having a system on a chip (SoC) 202 that may include an application processor 204 and an audio DSP 206. The application processor 204 is coupled to USB hardware 208 through a system or peripheral bus 210. The application processor 204 further communicates with the audio DSP 206 through traces 212 or other conductive element. The USB hardware 208 is coupled to a USB connector 214, which may be a USB receptacle into which an external USB device 216, such as a headset, is coupled, such as through a cable. In use, audio packets 218 pass to the audio DSP 206. The audio DSP 206 passes the audio packets 218 to the application processor 204 through the traces 212, where they are processed and passed to the USB hardware 208 through the system bus 210. In the opposite direction, and not specifically illustrated, audio data may originate at a microphone or other recording source and pass into the external USB device 216. From the external USB device 216, such audio data may pass through the USB connector 214, through the USB hardware 208, and then to the application processor 204, and finally to the audio DSP 206. For the playback situation, communication across the traces 212 adds latency to the time required for the audio packets 218 to reach the USB hardware 208. In some instances, this latency may be detected by the listener and is generally undesirable. Further, the application processor 204, which as noted above, consumes relatively large amounts of power, cannot be put into a low-power mode while processing the USB audio packets 218. Accordingly, the mobile communication device 200 depletes a battery power source and may otherwise suffer from poor audio performance.

Figure 3:
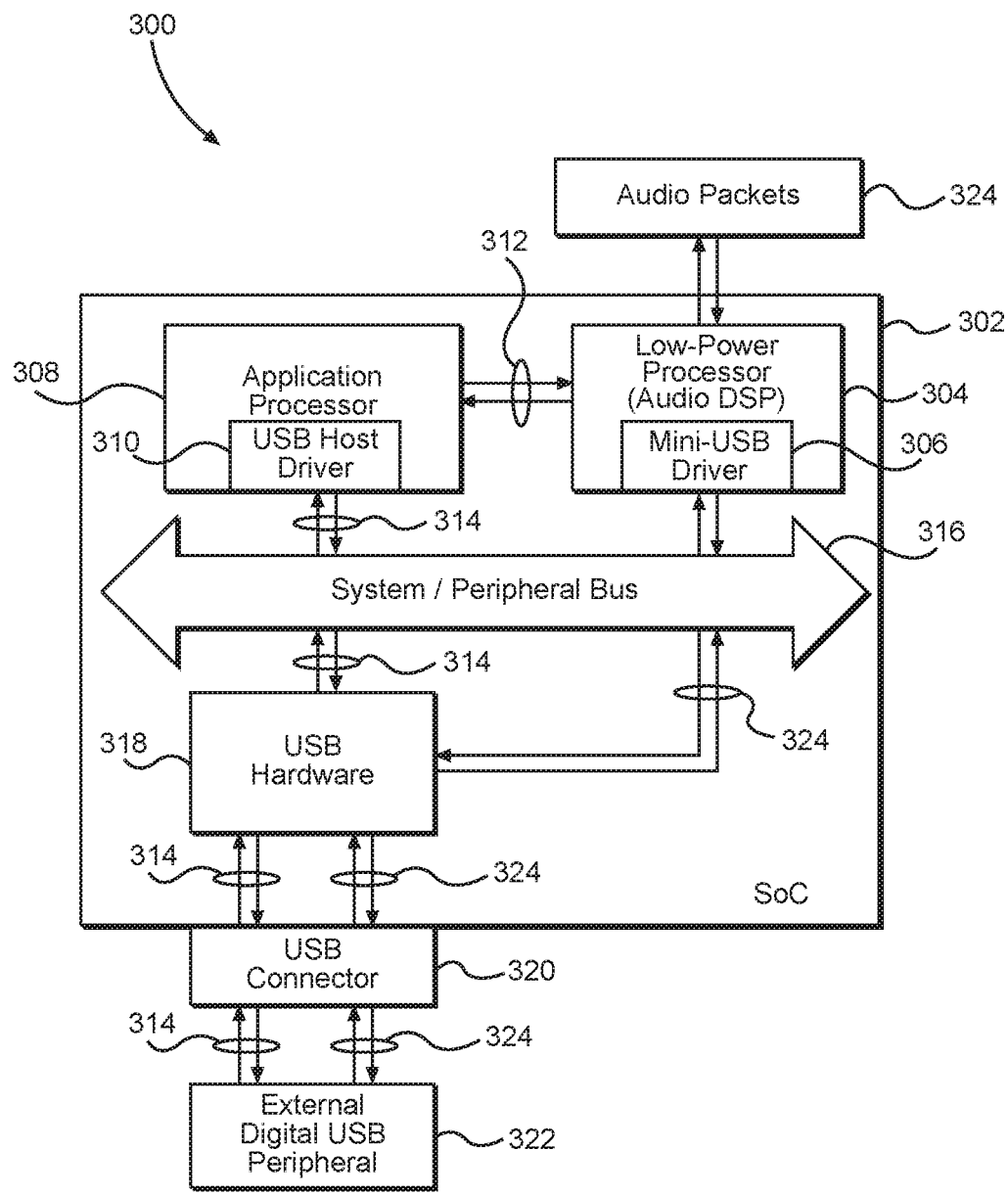
FIG. 3 is simplified block diagram of a USB communication path according to an exemplary aspect of the present disclosure during set-up.
Figure 4:
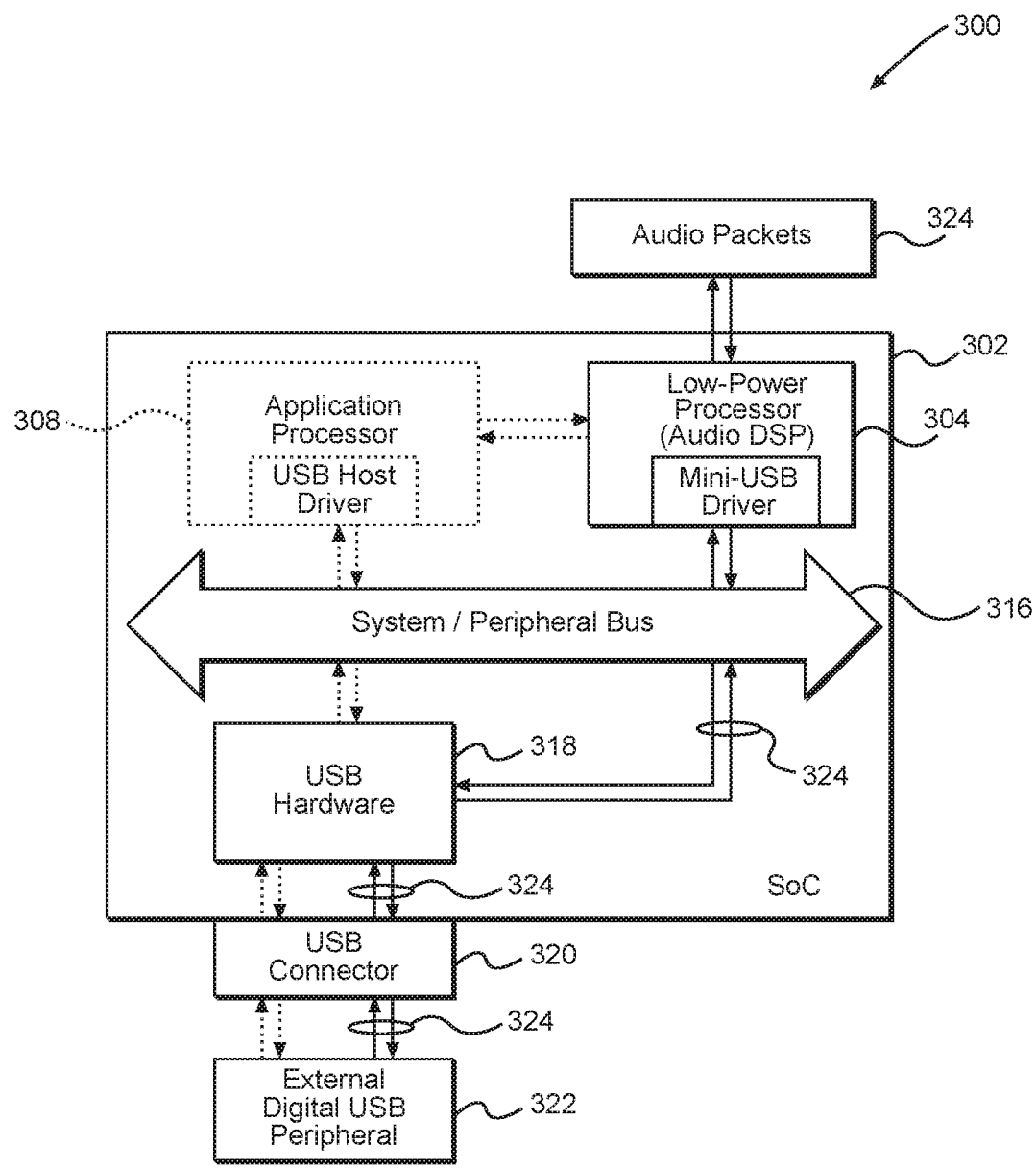
FIG. 4 is the USB communication path of FIG. 3 after set-up is complete.

In contrast to the power consumption and slow activity in the mobile communication device 200, exemplary aspects of the present disclosure move processing of packets, and more specifically multimedia packets, and more specifically audio packets, into a low-power processor such as the audio DSP and set up a communication path from the low-power processor to the USB hardware, effectively bypassing the application processor, which in turn allows the application processor to be placed in a low-power mode. In this regard, FIGS. 3 and 4 illustrate a mobile communication device 300 with an SoC 302. The SoC 302 includes a low-power processor 304 such as an audio DSP. The low-power processor 304 includes a mini-USB driver 306 therein. Note that the mini-USB driver 306 may also be referred to herein as a second driver to differentiate the mini-USB driver 306 from the USB host driver 310. The SoC 302 further includes an application processor 308 with a USB host driver 310 therein. The low-power processor 304 and the application processor 308 may communicate over traces 312 so as to allow inter-processor communication. The application processor 308 may communicate non-multimedia or non-audio data packets 314 to a system bus 316 which in turn passes the non-multimedia or non-audio data packets 314 to USB hardware 318. The USB hardware 318 may pass the non-multimedia or non-audio data packets 314 to a USB connector 320 and then to a remote external digital USB peripheral 322. Audio packets 324 are received at the low-power processor 304 and passed to the USB hardware 318 through the system bus 316. In an exemplary aspect, the application processor 308 sets up the communication path for the mini-USB driver 306 and then may enter a low-power mode as generally illustrated by the dotted elements in FIG. 4 as the low-power processor 304 and the mini-USB driver 306 pass the audio packets 324 back and forth to the remote external digital USB peripheral 322.

It should be appreciated that adding the mini-USB driver 306 includes allowing the mini-USB driver 306 to process an entirety of a protocol stack. For example, an entirety of an Open Systems Interconnection (OSI) stack is processed by the mini-USB driver 306 and the USB host driver 310 and not splitting, for example, layers 1-4 of stack at a driver on one of the processor versus layers 5-7 at another driver on another processor.

Figure 5:
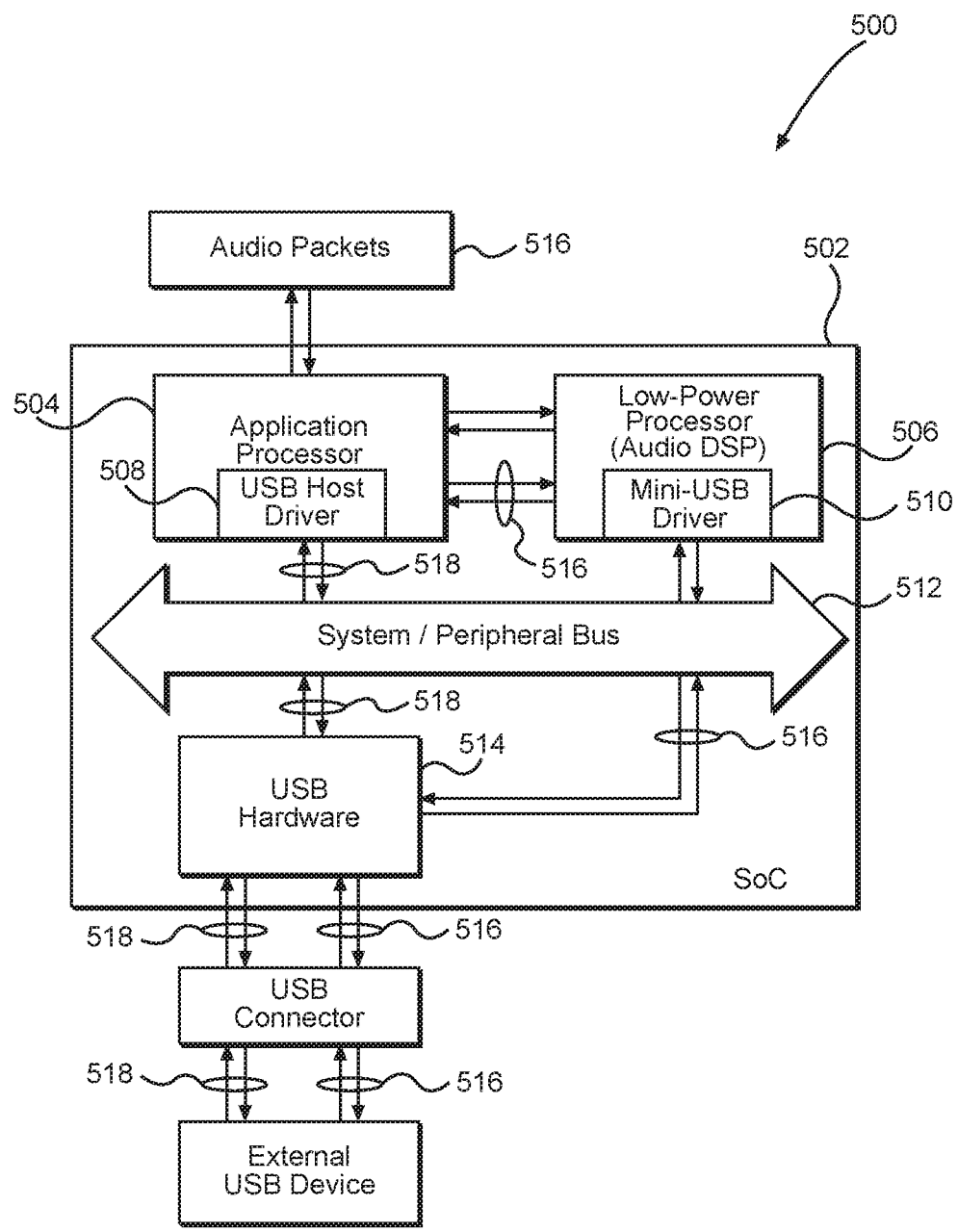
FIG. 5 is an alternate USB communication path where an application processor still is active in the USB communication path for certain functions.

While the arrangement of the mobile communication device 300 provides maximal opportunities to save power and reduce latency, other arrangements are possible and may still provide power saving opportunities. For example, as illustrated in FIG. 5, a mobile communication device 500 may include an SoC 502 that includes an application processor 504 and a low-power processor 506. The application processor 504 may include a USB host driver 508 and the low-power processor 506 may include mini-USB driver 510. Both the application processor 504 and the low-power processor 506 are coupled to a system bus 512. Likewise, USB hardware 514 is coupled to the system bus 512. Audio packets 516 are passed to the application processor 504 which performs encoding and decoding, and then passes the audio packets 516 to the low-power processor 506. The low-power processor 506 passes the audio packets 516 to the USB hardware 514 through the system bus 512. The application processor 504 sends non-audio packets 518 to the USB hardware 514 through the system bus 512. While the arrangement of the mobile communication device 500 adds latency as the audio packets 516 pass from the application processor 504 to the low-power processor 506, the application processor 504 may intermittently enter a sleep state after filling up buffers (not shown) within the low-power processor 506.

Figure 6:
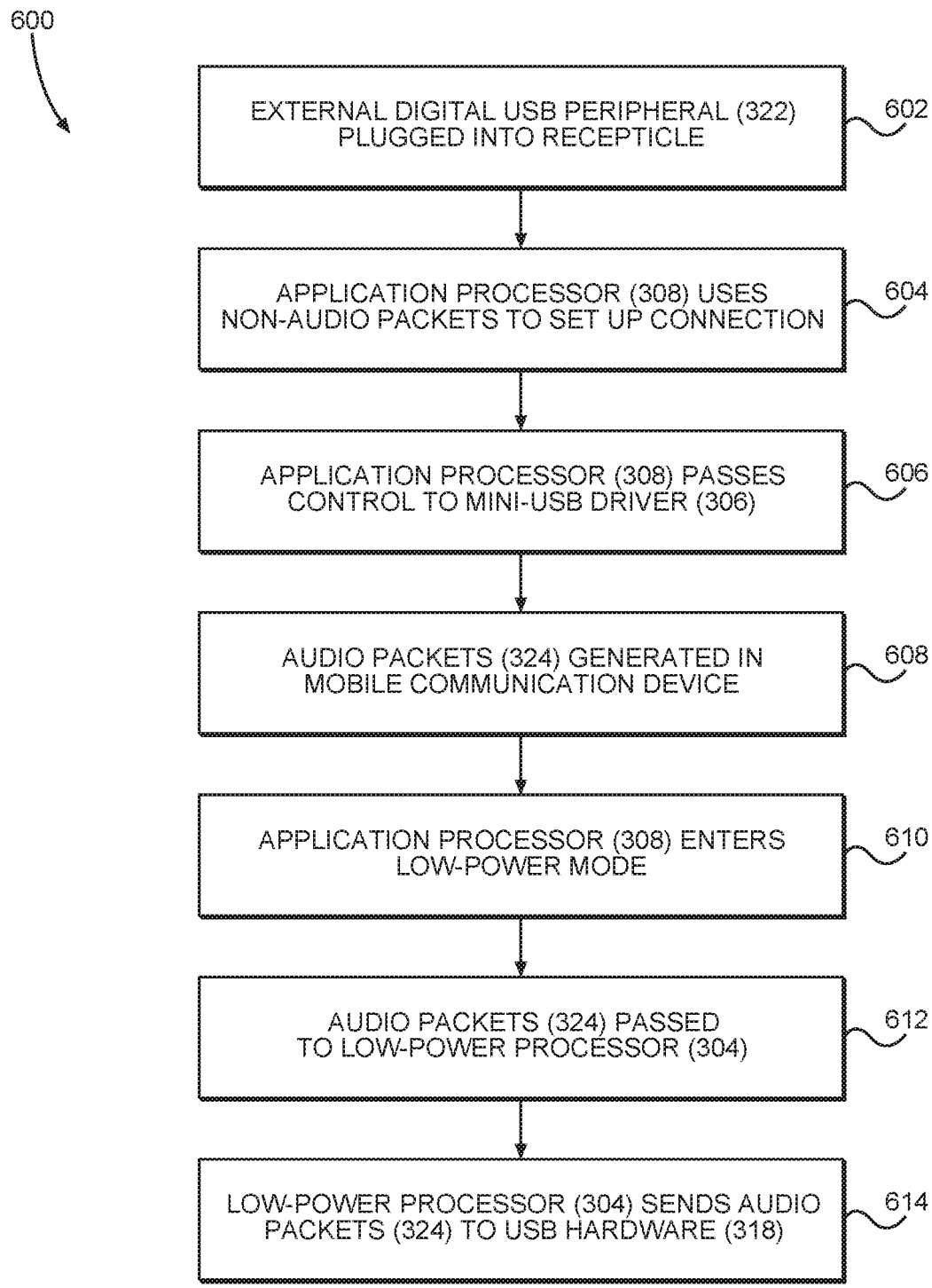
FIG. 6 is a flowchart of an exemplary process for setting up a USB communication path according to the present disclosure.

A flowchart of a simplified process 600 according to an exemplary aspect of the present disclosure is provided with reference to FIG. 6. The process 600 begins when an external digital USB peripheral 322 (such as a digital headset) is plugged into a receptacle on a mobile communication device (block 602). The application processor 308 uses non-audio packets to set up a connection (block 604) between the low-power processor 304 and the USB hardware 318 and a corresponding endpoint in the external digital USB peripheral 322. The application processor 308 then passes control over the connection to the mini-USB driver 306 (block 606). Audio packets 324 are generated in the mobile communication device (block 608). These audio packets 324 may be from an audio file stored on the mobile communication device, streamed from a remote server, stored on a remote memory device, or the like. The application processor 308 may enter a low-power mode (block 610). The audio packets 324 are passed to the low-power processor 304 (block 612) from the audio source (e.g., the audio file in memory). The low-power processor 304 then sends the audio packets 324 to the USB hardware 318 (block 614) without sending the audio packets through the application processor 308.

Figure 7:
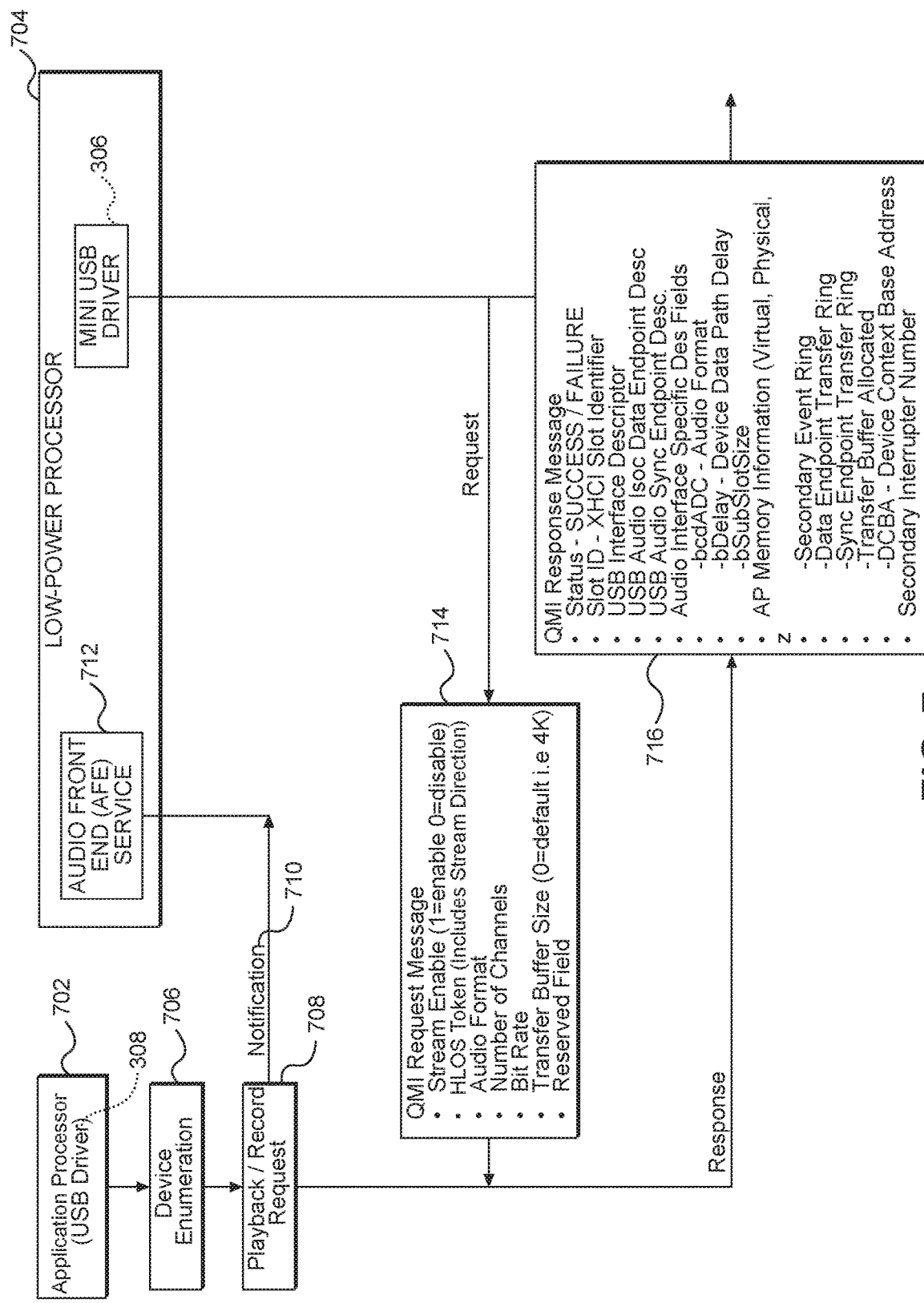
FIG. 7 is a high-level signal flow diagram for USB communication path set-up between an application processor and an audio digital signal processor (DSP)

FIG. 7 illustrates a high-level version of a signal flow 700 between an application processor 702 (e.g., which may be the application processor 308 having the USB host driver 310 of FIG. 3) and a low-power processor 704 (e.g., which may be the audio DSP (A-DSP) or other low-power processor 304 having the mini-USB driver 306 of FIG. 3). In particular, the USB hardware (e.g., USB hardware 318) detects insertion and reports insertion to the application processor 702. The application processor 702, using its USB driver, performs device enumeration (block 706). The application processor 702 receives a playback or record request from the external peripheral (block 708). The playback or record request triggers a notification 710 to an audio front end (AFE) service 712 on the low-power processor 704, and may include a variety of information such as the high-level operating system (HLOS) operating token, a sampling rate, a bit width, a number of channels, a number of samples per interval, a sample size in bytes, direction (playback or record), data format, and justification. In response to receipt of this information the mini-USB driver 306 in the low-power processor 704 sends a request to the USB driver on the application processor 702. This request may include a stream enable command, the HLOS token, the audio format, the number of channels, bit rate, transfer buffer size, and a reserved field (block 714). The application processor 702 responds with additional information (block 716) including a status, a slot identifier, a USB interface descriptor, a USB audio isochronous data endpoint description, specific audio interface fields including audio format, device data path delay and slot size, any application processor specific memory information such as an address (virtual, physical, and/or size), a transfer buffer allocated, a device context base address, a secondary interrupter number, a USB core identifier, and a port number. The USB (controller) core identifier is a unique number that identifies a USB core physically (e.g., a base address of the USB controller). The USB controller identifier is used when multiple instances of USB controllers are present in a SoC. Each USB controller may be connected to multiple physical ports which are uniquely identified by port number.

Figure 8A:
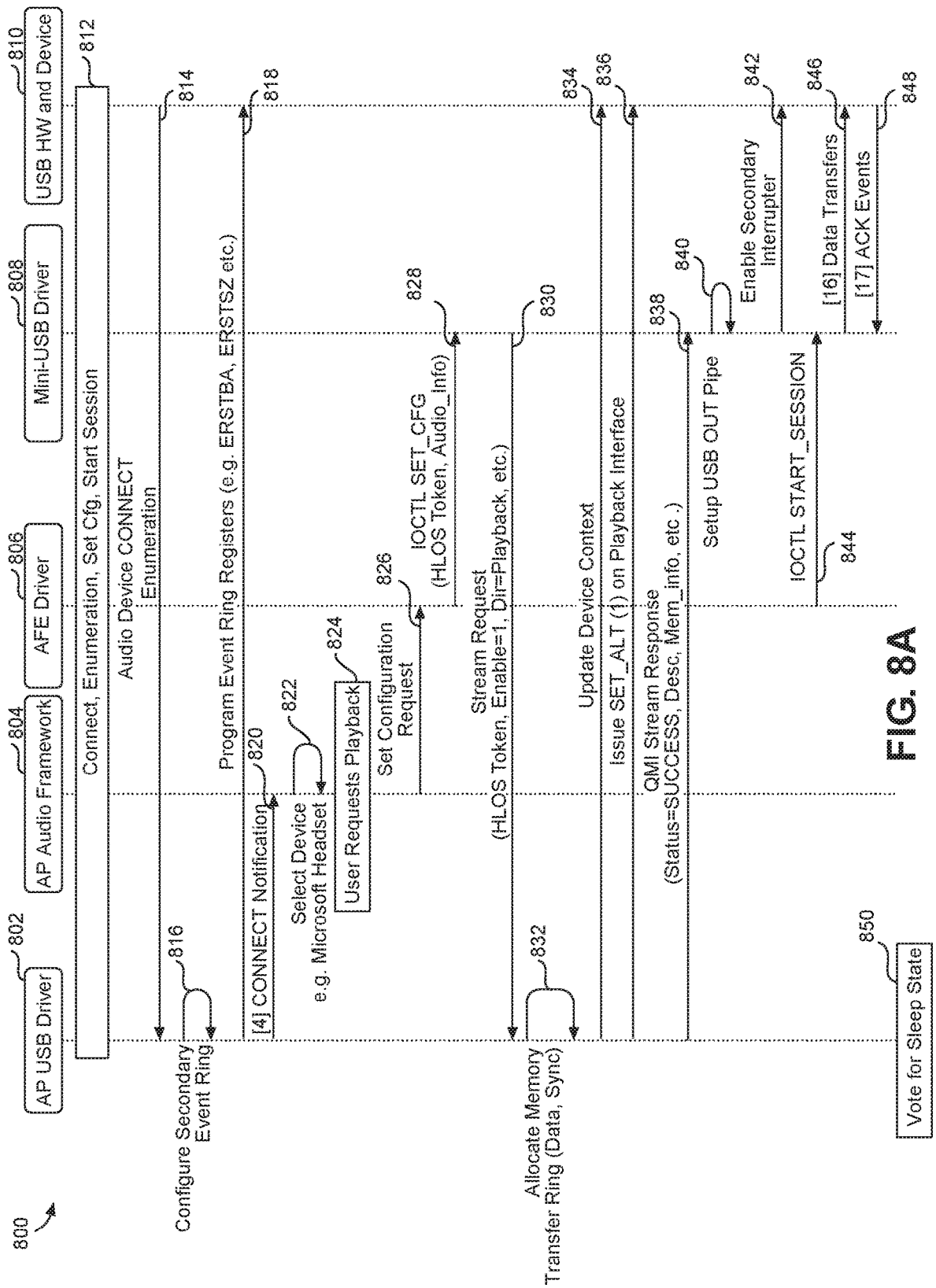
FIGS. 8A-8F represent more specific signal flow diagrams for the USB communication path set-up, stop, and disconnect of FIG. 7.

Likewise, FIGS. 8A-8F illustrate more detailed versions of the signal flows between the various elements according to exemplary aspects of the present disclosure. In this regard, FIG. 8A illustrates a session 800 beginning with interrupts enabled. In particular, FIG. 8A illustrates an application processor USB driver 802, working with an application processor audio framework 804, an AFE driver 806, a mini-USB driver 808, and USB hardware 810. The signaling begins with connection, enumeration, configuration, and session start (block 812). The USB hardware 810 detects an audio device connection and begins enumeration (signal 814). The USB driver 802 configures a secondary event ring (signal 816) and programs event ring registers in the USB hardware 810 (signal 818). The USB driver 802 sends a connection notification to the audio framework 804 (signal 820), which provides a select device popup (signal 822) such as "select MICROSOFT headset" to the user. The audio framework receives a user request for playback (signal 824) and sends a set configuration request (signal 826) to the AFE driver 806. The AFE driver 806 sends a signal 828 to the mini-USB driver 808. The signal 828 is analogous to signal 710 and may include a token and other audio information. The mini-USB driver 808 sends a stream request to the USB driver 802 (signal 830). The USB driver 802 allocates memory, initiates the transfer ring, and creates the transfer data buffer (signal 832). The USB driver 802 then sends a command to update the device context to the USB hardware 810 (signal 834) as well as issue a SET_ALT command on the Playback Interface (signal 836). The USB driver 802 sends a stream response with status information to the mini-USB driver 808 (signal 838). The mini-USB driver 808 sets up the USB pipe (signal 840) and enables the secondary interrupter (signal 842) at the USB hardware 810. The AFE driver 806 starts the session with signal 844 to the mini-USB driver 808 (signal 844). The process continues with data transfers (signals 846) and ACK events (signals 848) until a vote for a sleep state 850 occurs.

Figure 8B:
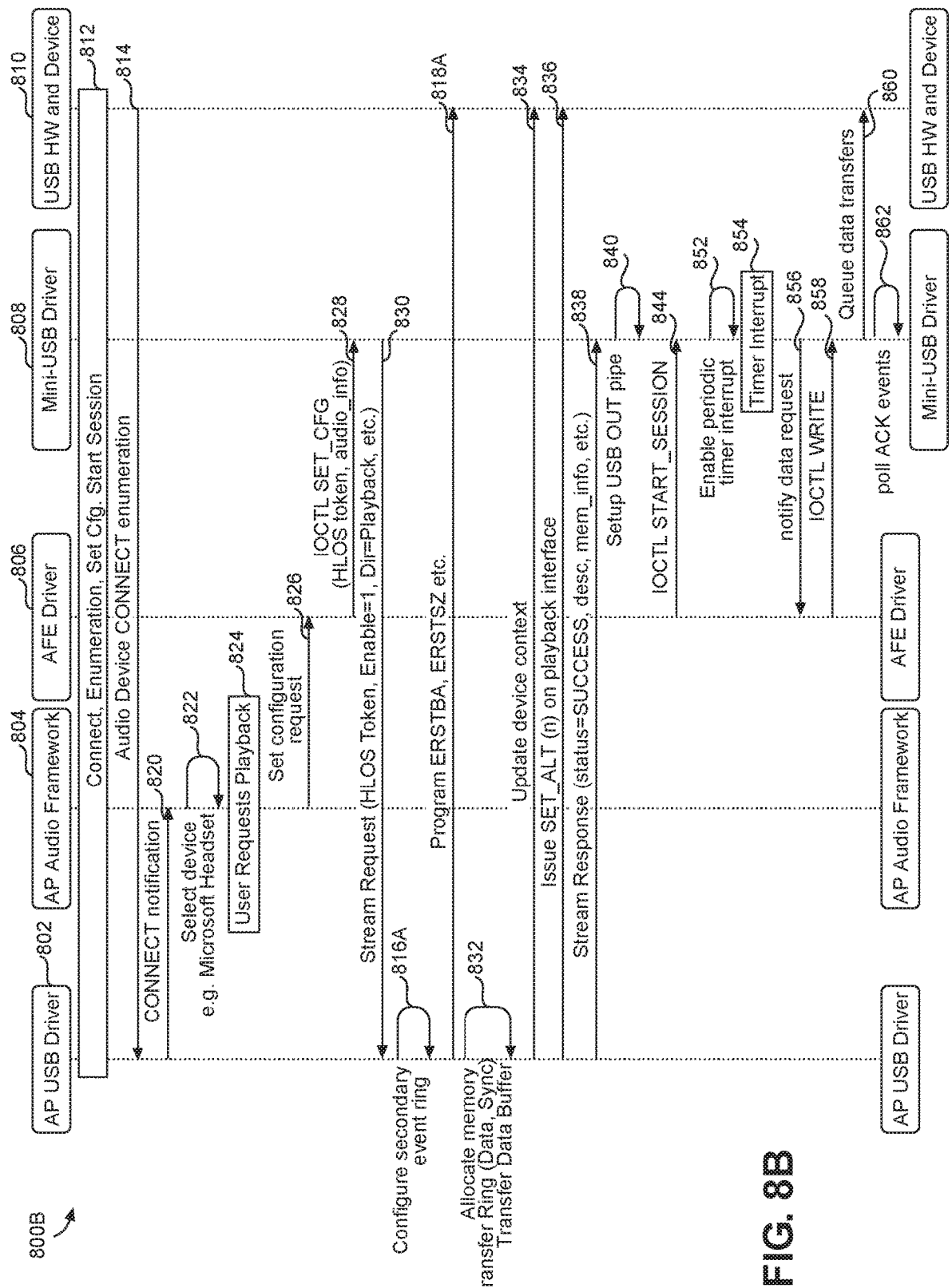

FIG. 8B illustrates a session beginning with polling in place of interrupting. In most regards, the process 800B is similar to the process 800 of FIG. 8A. The configuration of the secondary event ring (signal 816A) and the programming of the event registers (signal 818A) are moved after the stream request signal 830. Further the enabling of the secondary interrupter (signal 842) is omitted. In place of the secondary interrupter, the process 800B uses polling. To allow for polling, the mini-USB driver 808 enables a periodic timer interrupt (signal 852). When a timer interrupt (block 854) occurs in response to the timer, the mini-USB driver 808 sends a notify data request (signal 856) to the AFE driver 806 and receives a write signal 858 therefrom. The mini-USB driver 808 looks at the queue data transfers at the USB hardware 810 (signal 860) and polls the ACK events (signal 862).

Figure 8C:
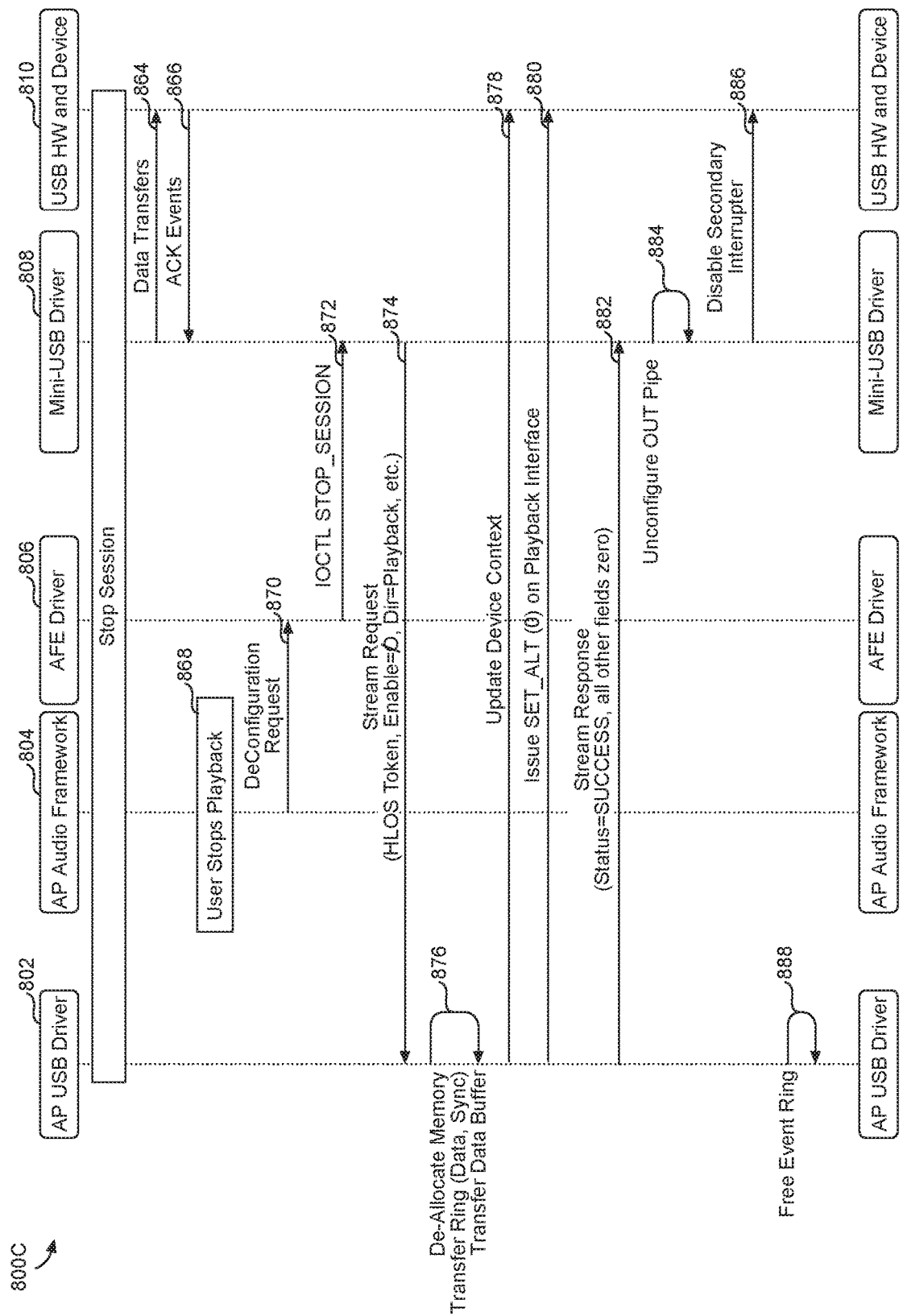

FIG. 8C illustrates a session stopping process 800C. Initially, the mini-USB driver 808 and the USB hardware 810 exchange data transfers and ACK events (signals 864 and 866, respectively). The user stops playback (block 868) and the audio framework initiates a deconfiguration request (signal 870) to the AFE driver 806. The AFE driver 806 sends a stop session command to the mini-USB driver 808 (signal 872), which sends a stream request to the USB driver 802. The USB driver 802 de-allocates memory, transfer ring, and the transfer data buffer (signal 876) and updates the device context with signal 878 to the USB hardware 810. Additionally, the USB driver 802 issues a command for the playback interface on the USB hardware (signal 880) and provides a stream response to the mini-USB driver 808 (signal 882). The mini-USB driver 808 unconfigures the OUT pipe (signal 884) and disables the secondary interrupter (signal 886). The USB driver 802 then allows for a free event ring (signal 888).

Figure 8D:
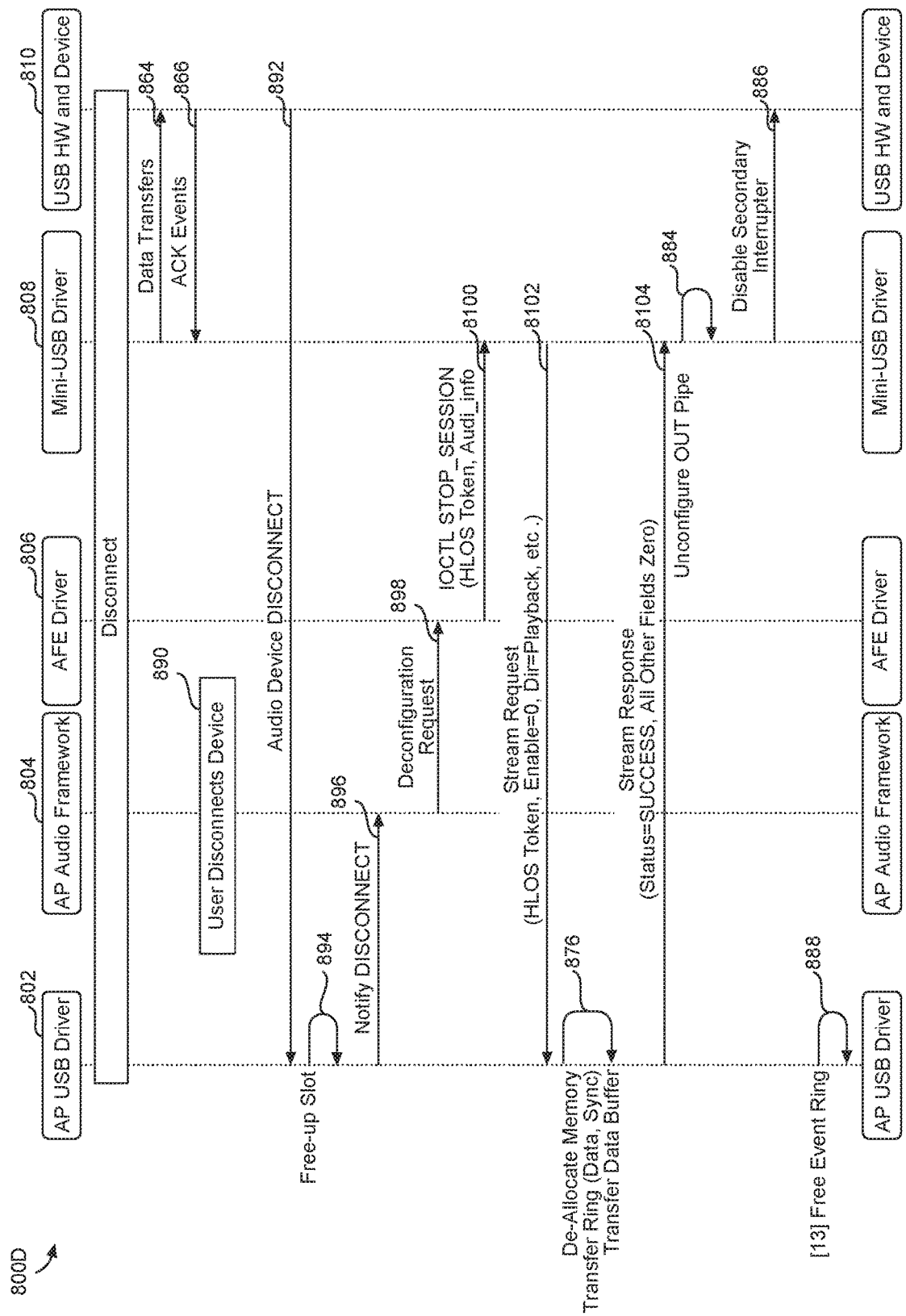

FIG. 8D illustrates a session ending through disconnection process 800D. The process 800D begins with the mini-USB driver 808 and the USB hardware 810 exchanging data transfers and ACK events (signals 864 and 866, respectively). The user disconnects the peripheral device (block 890). The USB hardware 810 sends an audio device disconnect signal 892 to the USB driver 802. The USB driver 802 advertises a free-up slot event (signal 894) and sends a notification of a disconnect to the audio framework 804 (signal 896). The audio framework 804 sends a deconfiguration request to the AFE driver 806 (signal 898), which in turn sends a stop session command to the mini-USB driver 808 (signal 8100). The mini-USB driver 808 sends a stream request to the USB driver 802 (signal 8102), which de-allocates memory, transfer ring, and transfer data buffer (signal 876). The USB driver 802 then sends a stream response to the mini-USB driver 808 (signal 8104). The mini-US driver 808 then unconfigures the OUT pipe (signal 884) and the process 800D concludes similarly to the process 800C.

Figure 8E:
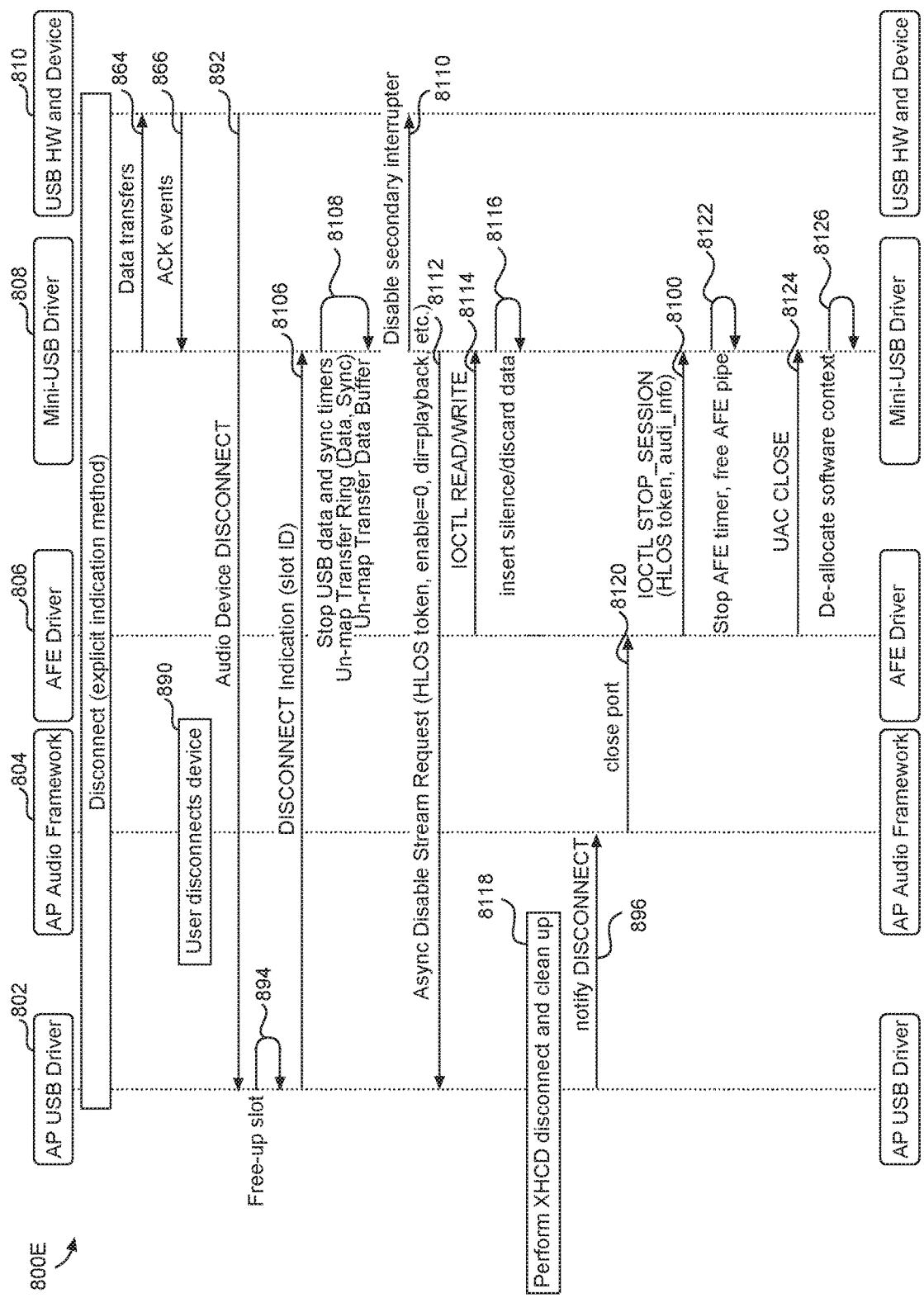

FIG. 8E illustrates a session ending through disconnection process 800E with the disconnect notification going to the ADSP mini-USB driver. The process 800E begins with the mini-USB driver 808 and the USB hardware 810 exchanging data transfers and ACK events (signals 864 and 866, respectively). The user disconnects the peripheral device (block 890). The USB hardware 810 sends an audio device disconnect signal 892 to the USB driver 802. The USB driver 802 advertises a free-up slot event (signal 894) and sends a notification of a disconnect to the mini-USB driver 808 with a slot identification (signal 8106). The mini-USB driver 808 stops USB data and sync timers and un-maps a transfer ring and data buffer (signal 8108). The mini-USB driver 808 then disables the secondary interrupter (signal 8110) and sends an asynchronous disable stream request to the USB driver 802 (signal 8112). The AFE driver 806 then sends a read/write command to the mini-USB driver (signal 8114), which inserts silence and/or discards data as appropriate (signal 8116). Meanwhile, the USB driver 802 performs a disconnect and clean up (signal 8118) and notifies the audio framework 804 of the disconnect (signal 896). The audio framework 804 then closes the appropriate port (signal 8120) at the AFE driver 806. The AFE driver 806 then sends a stop session command to the mini-USB driver 808 (signal 8100). The mini-USB driver 808 stops the AFE timer and frees the AFE pipe (signal 8122). The AFE driver 806 then sends a UAC close command (signal 8124), and the mini-USB driver 808 de-allocates the software context (signal 8126).

Figure 8F:
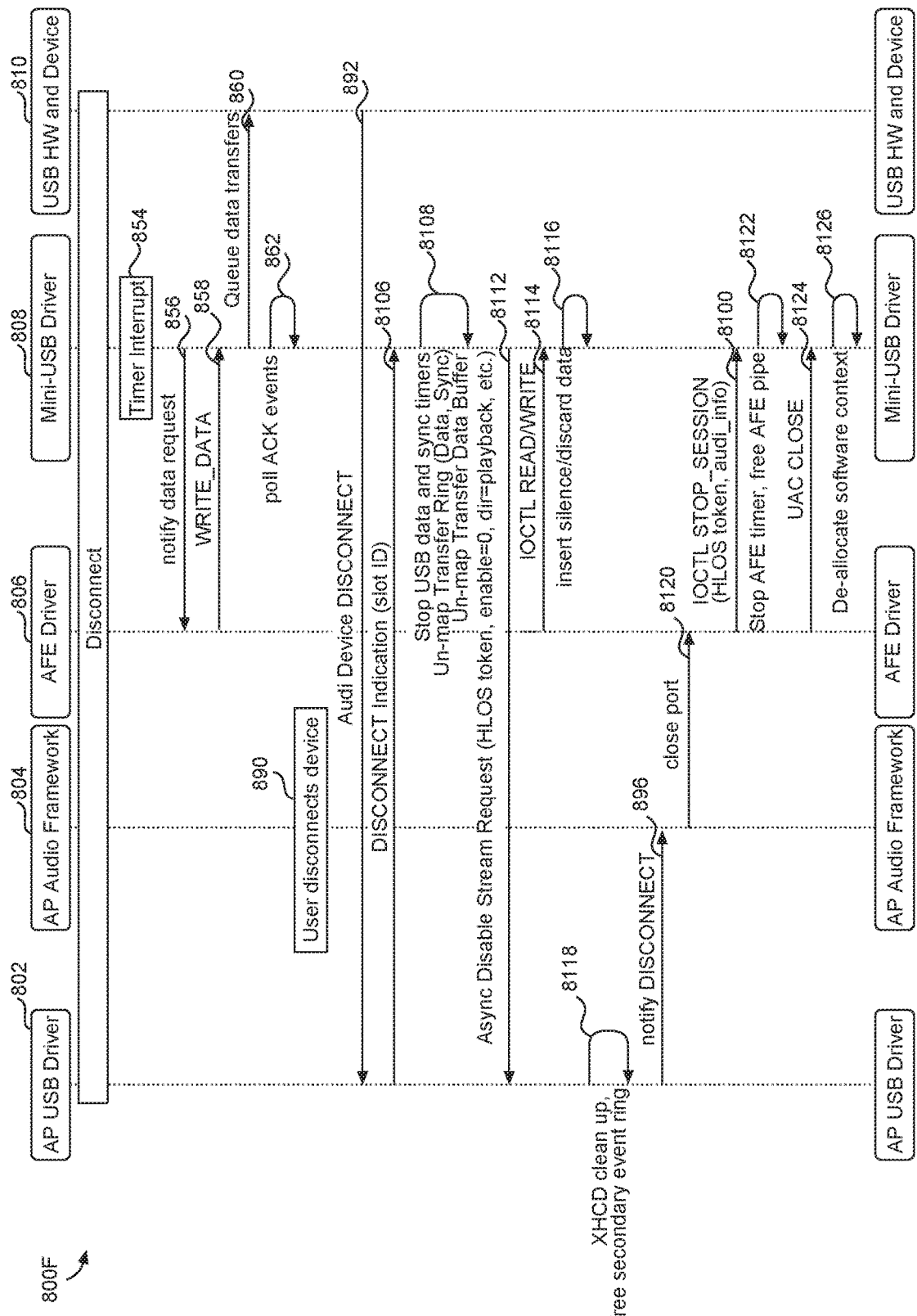
Figure 9A:
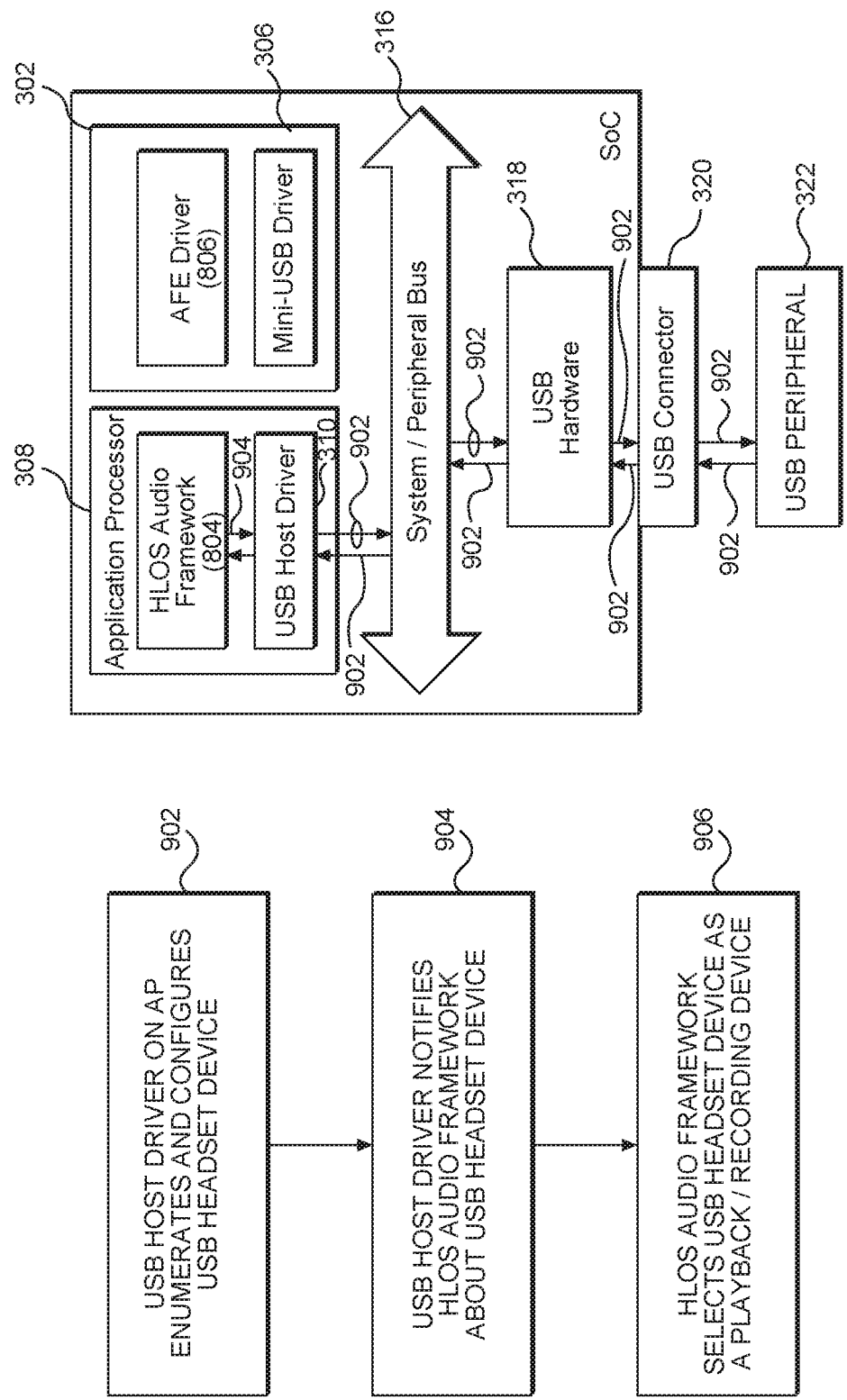
FIGS. 9A-9E represent an exemplary use case of an audio call using a USB communication path according to exemplary aspects of the present disclosure.
Figure 9B:
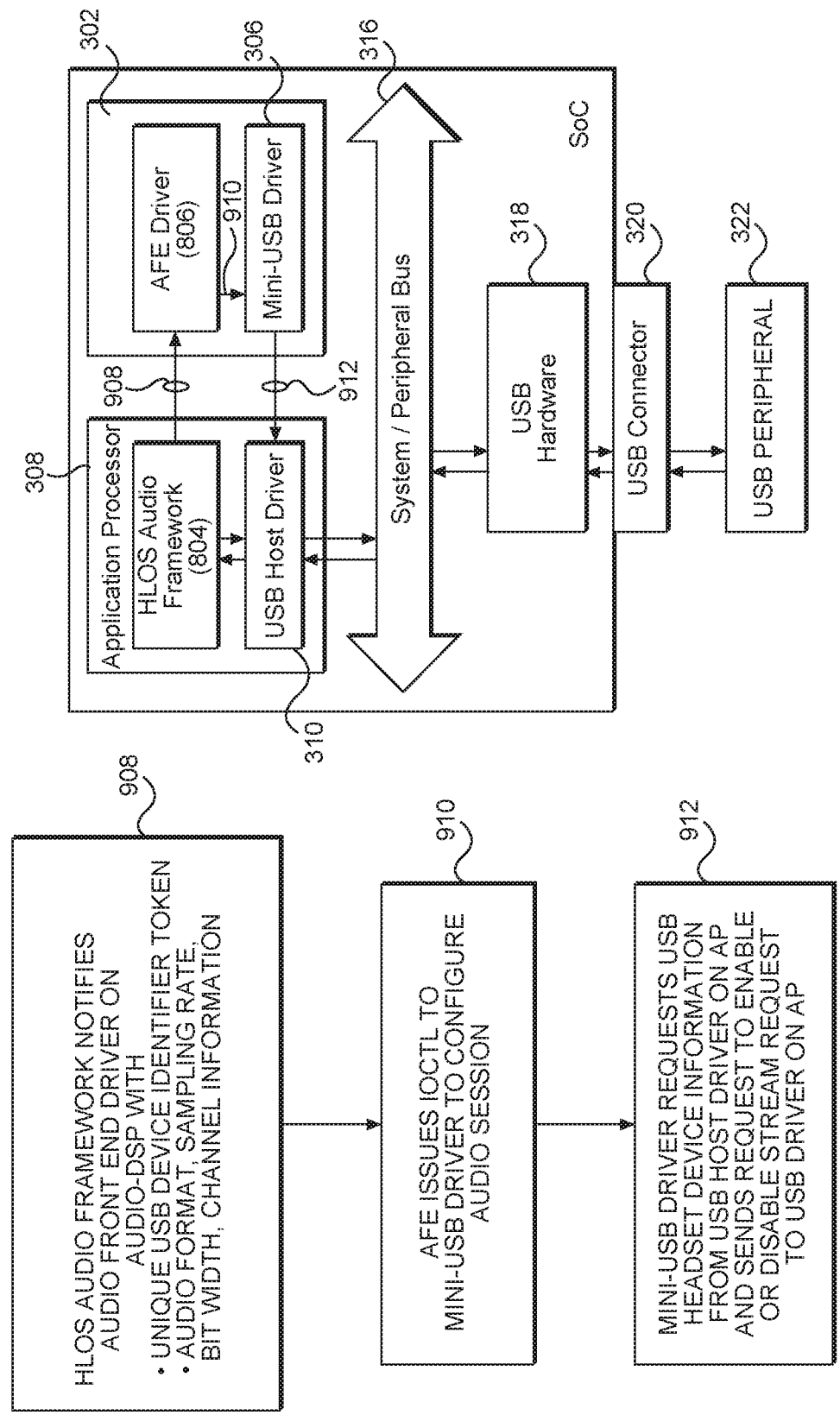
Figure 9C:
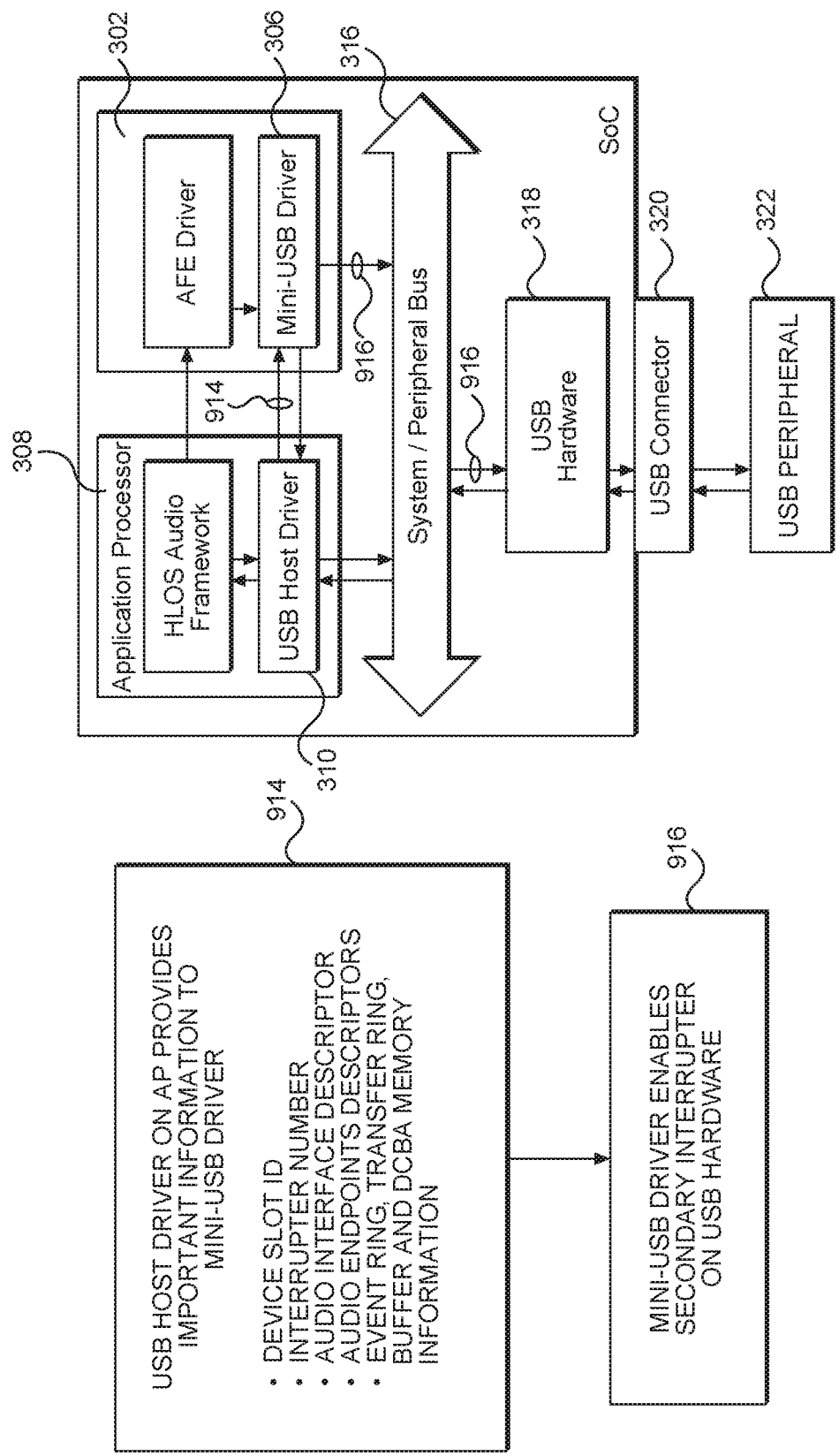
Figure 9D:
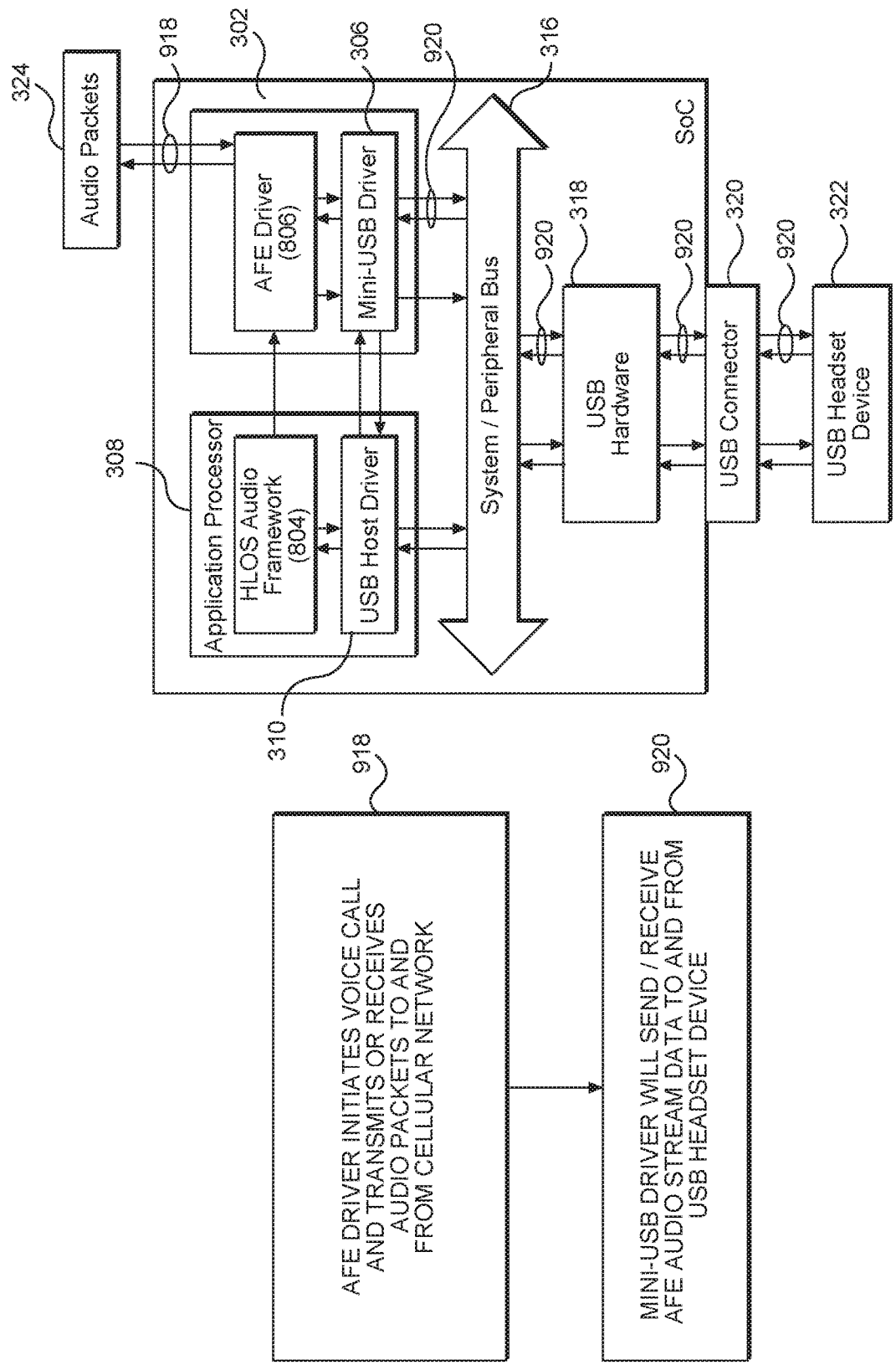
Figure 9E:
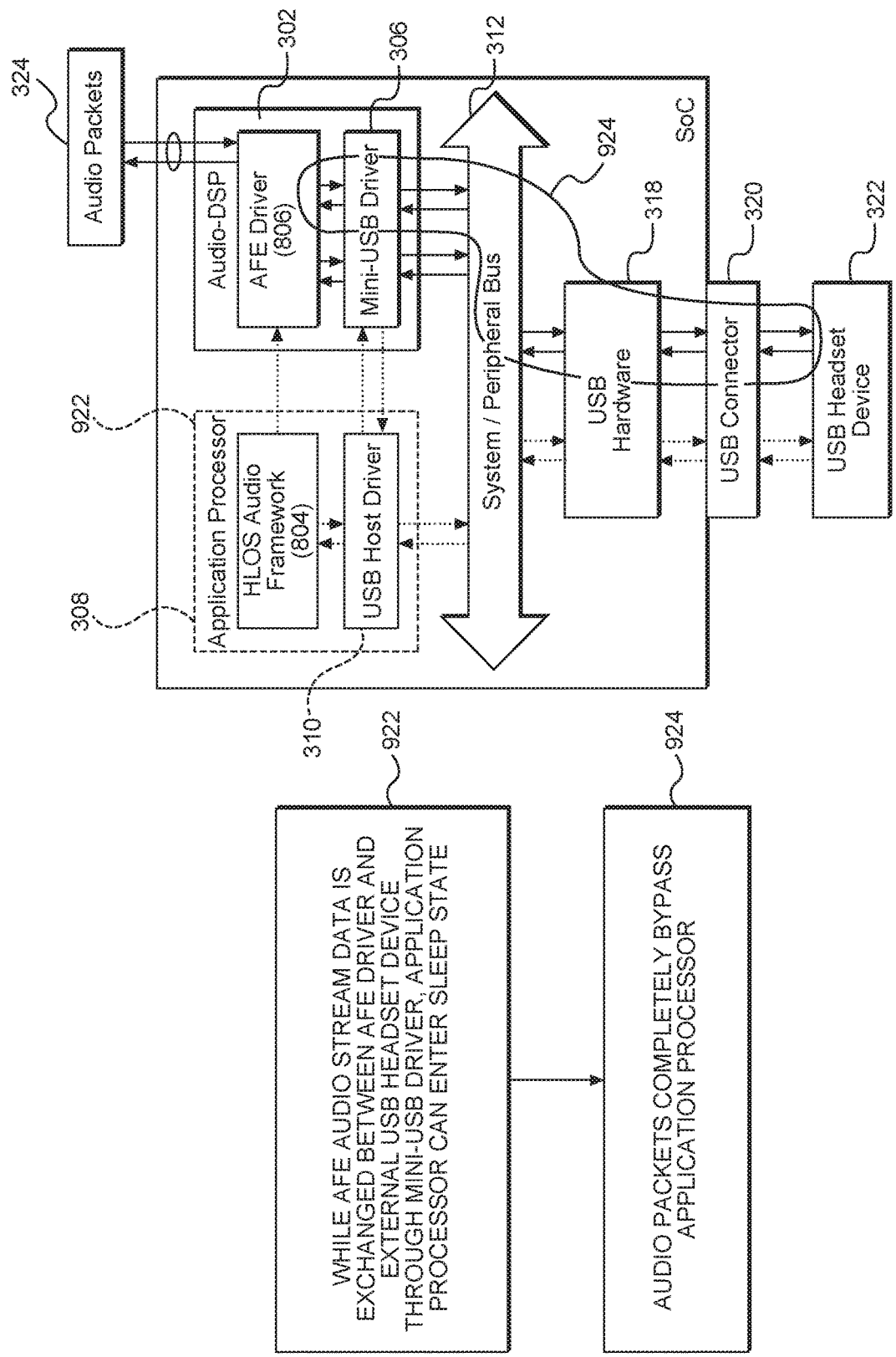

FIG. 8F illustrates process 800F for a session ending through disconnection without interrupts (i.e., using polling). The process 800F begins with a timer interrupt (block 854) with signals 856, 858, 860, and 862 (see FIG. 8B above). The user disconnects the peripheral device (block 890). The USB hardware 810 sends an audio device disconnect signal 892 to the USB driver 802. The USB driver 802 sends a notification of a disconnect to the mini-USB driver 808 with a slot identification (signal 8106). The mini-USB driver 808 stops USB data and sync timers and un-maps a transfer ring and data buffer (signal 8108). The mini-USB driver 808 sends an asynchronous disable stream request to the USB driver 802 (signal 8112). The AFE driver 806 then sends a read/write command to the mini-USB driver (signal 8114), which inserts silence and/or discards data as appropriate (signal 8116). Meanwhile, the USB driver 802 performs a disconnect and clean up (signal 8118) and notifies the audio framework 804 of the disconnect (signal 896). The audio framework 804 then closes the appropriate port (signal 8120) at the AFE driver 806. The AFE driver 806 then sends a stop session command to the mini-USB driver 808 (signal 8100). The mini-USB driver 808 stops the AFE timer and frees the AFE pipe (signal 8122). The AFE driver 806 then sends a UAC close command (signal 8124), and the mini-USB driver 808 de-allocates the software context (signal 8126). Note that the secondary interrupter does not need to be disabled since it is not present in the polling aspect.

In FIG. 8D, the disconnect notification is passed to the mini-USB driver 808 implicitly through the audio framework 804 on the application processor USB driver 802. In contrast, in FIG. 8E, the disconnect notification is passed to the mini-USB driver 808 explicitly. The difference between FIGS. 8E and 8F lies in the lack of interrupts and the use of polling in FIG. 8F.

FIGS. 9A-9E illustrate a use case of the process 600 of FIG. 6 and, in particular, illustrate a voice call. After the external digital USB peripheral 322, in this case a USB headset device, is plugged in, the USB host driver 310 on the application processor 308 enumerates and configures the USB headset device (block 902) using non-audio packets. The USB host driver 310 notifies the HLOS audio framework 804 about the USB headset device (block 904). The HLOS audio framework 804 selects the USB headset device as a playback/recording device (block 906).

The HLOS audio framework 804 notifies an audio front end (AFE) driver 806 on the low-power processor 304 with a unique USB device identifier token, an audio format, sampling rate, bit width, channel information, and the like (block 908). The AFE driver 806 issues an input/output control (IOCTL) notification to the mini-USB driver 306 to configure an audio session (block 910). The mini-USB driver 306 requests the USB headset device information from the USB host driver 310 on the application processor 308 and sends a request to enable or disable stream request to the USB host driver 310 on the application processor 308 (block 912).

The USB host driver 310 on the application processor 308 provides information to the mini-USB driver 306 (block 914) including device slot ID, interrupter number, audio interface descriptor, audio endpoints/descriptors, event ring, transfer ring, buffer, and device context base address (DCBA) information. More information about the DCBA may be found in the extensible host controller interface (xHCI) specification. The mini-USB driver 306 enables a second interrupter on the USB hardware 318 (block 916).

The AFE driver 806 transmits or receives audio packets to and from a cellular network (block 918). The mini-USB driver 306 will send and/or receive AFE audio stream data to and from the USB headset device (block 920). Additionally, the mini-USB driver 306 may request that the USB host driver 310 enable or disable an audio stream. In response, the USB host driver 310 will select an alternate interface to enable or disable the audio stream using a control endpoint.

While the AFE audio stream data is exchanged between the AFE driver 806 and the USB headset device through the mini-USB driver 306, the application processor 308 can enter a sleep state (block 922). The audio packets thus completely bypass the application processor 308 (block 924).

FIGS. 10A and 10B illustrate signal flows for a sub-system reset for a low-power processor. In FIG. 10A, a process 1000A begins with the mini-USB driver 808 and the USB hardware 810 exchanging data transfers and ACK events (signals 864 and 866, respectively). The low-power processor experiences a sub-system reset (block 1002). The USB driver 802 receives a client disconnect notification (block 1004) and begins event ring cleanup (signal 1006). The USB driver 802 disables the secondary interrupter at the USB hardware 810 (signal 1008) and disables audio streams in and out (signal 1010) at the USB hardware 810. At some future time, the low-power processor sub-system is out of reset (block 1012). The audio framework 804 receives an out of reset notification (signal 1014) and the USB driver 802 experiences a client connect notification (block 1016). In process 1000A, the USB driver 802 reprograms ERSTBA and ESTSZ after configuration of the secondary event ring (signal 1018) and restarts the playback and/or recording (block 1020), which causes the audio framework 804 to set the configuration request to the AFE driver 806 (signal 1022). The AFE driver 806 then sends the set configuration command to the mini-USB driver 808 (signal 1024). The USB driver 802 sends a stream request to the mini-USB driver 808 (signal 1026) and allocates memory, transfer ring, and data buffer (signal 1028). The USB driver 802 then updates the device context at the USB hardware 810 (signal 1030) and issues the SET-ALT command on the playback device (signal 1032). The USB driver 802 sends a stream response to the mini-USB driver 808 (signal 1034), and the mini-USB driver 808 sets up the out/in pipe (signal 1036). The process 1000A continues similarly to the process 800 of FIG. 8A.

In contrast, in FIG. 10B, the secondary event ring is configured with the subsequent reprogramming of the ERSTBA and ERSTSZ (signal 1018) that takes place after the restart.

While the ability to offload processing to the low-power processor provides power saving opportunities, there may be times when latency concerns override the desire for power savings. Accordingly, the present disclosure contemplates that the application processor may evaluate latency requirements and implement or skip utilization of the mini-USB driver on the low-power processor.

Figure 11:
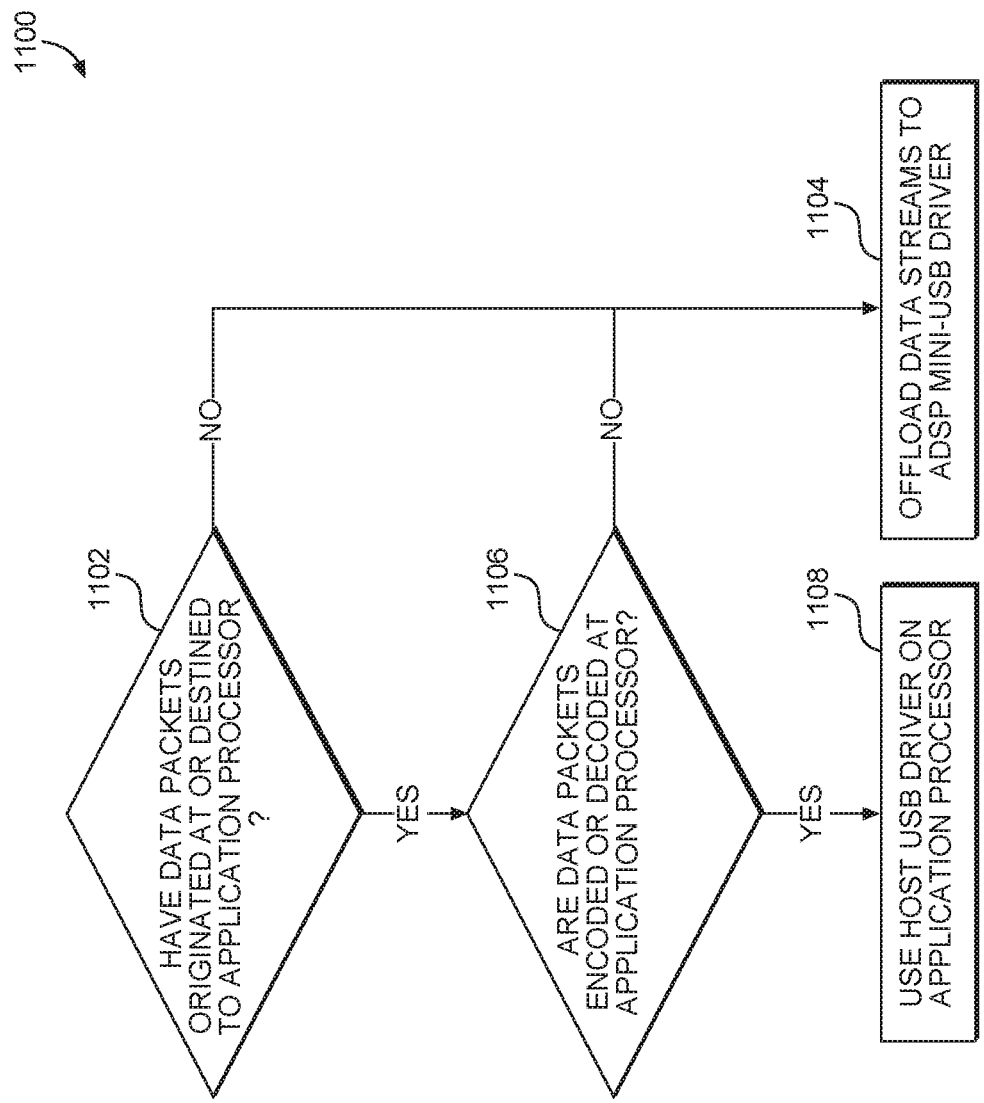
FIG. 11 is a flowchart illustrating path selection based on latency requirements.

In this regard, FIG. 11 illustrates a process 1100 that is performed at the application processor to determine whether to off-load processing to the mini-USB driver. Specifically, the application processor determines whether the data packets have originated at or are destined for the application processor (block 1102). If the answer is no, then the application processor implements aspects of the present disclosure as set forth above, by off-loading data streams to the mini-USB driver (block 1104). If, however, the data packets do originate at or are destined for the application processor, the application processor determines if the data packets are encoded or decoded at the application processor (block 1106). If the answer to block 1106 is no, then the application processor offloads the data streams to the mini-USB driver (block 1104). If, however, the encoding/decoding does occur at the application processor, then the application processor uses the host USB driver to process the packets (block 1108).

The systems and methods for using distributed USB host drivers according to aspects disclosed herein may be provided in or integrated into any processor-based device.

Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

In this regard, FIG. 12 illustrates an example of a processor-based system 1200 that can employ the mobile communication device 100 illustrated in FIG. 1. In this example, the processor-based system 1200 includes one or more central processing units (CPUs) 1202, each including one or more processors 1204. The CPU(s) 1202 may have cache memory 1206 coupled to the processor(s) 1204 for rapid access to temporarily stored data. The CPU(s) 1202 is coupled to a system bus 1208 and can intercouple master and slave devices included in the processor-based system 1200. As is well known, the CPU(s) 1202 communicates with these other devices by exchanging address, control, and data information over the system bus 1208. For example, the CPU(s) 1202 can communicate bus transaction requests to a memory controller 1210 as an example of a slave device.

Other master and slave devices can be connected to the system bus 1208. As illustrated in FIG. 12, these devices can include a memory system 1212, one or more input devices 1214, one or more output devices 1216, one or more network interface devices 1218, and one or more display controllers 1220, as examples. The input device(s) 1214 can include any type of input device, including, but not limited to, input keys, switches, voice processors, etc. The output device(s) 1216 can include any type of output device, including, but not limited to, audio, video, other visual indicators, etc. The network interface device(s) 1218 can be any devices configured to allow exchange of data to and from a network 1222. The network 1222 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1218 can be configured to support any type of communications protocol desired. The memory system 1212 can include one or more memory units 1224(0-N).

The CPU(s) 1202 may also be configured to access the display controller(s) 1220 over the system bus 1208 to control information sent to one or more displays 1226. The display controller(s) 1220 sends information to the display(s) 1226 to be displayed via one or more video processors 1228, which process the information to be displayed into a format suitable for the display(s) 1226. The display(s) 1226 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A system on a chip, comprising:
   a system bus;
   Universal Serial Bus (USB) B) hardware;
   a USB connector communicatively coupled to the USB hardware and configured to couple to an external digital USB peripheral;
   an application processor communicatively coupled to the USB hardware through the system bus, the application processor comprising a USB host driver; and
   an audio digital signal processor (DSP) communicatively coupled to the USB hardware through the system bus, the audio DSP comprising a second USB driver;
   wherein the application processor is configured to enumerate and set up a USB endpoint through the USB hardware and the USB connector and pass data about the USB endpoint to the audio DSP such that the audio DSP may pass audio packets to the USB hardware.

2. The system on a chip of claim 1, wherein the application processor is further configured to enter a low-power mode while the audio DSP passes the audio packets to the USB hardware.

3. A method of controlling a Universal Serial Bus (USB) endpoint, comprising:
   enumerating a USB endpoint with a USB driver on an application processor;
   receiving a request from a second USB driver on an audio digital signal processor (DSP) to enable or disable an audio data stream;
   responsive to the request, enabling or disabling a selected audio interface using control endpoints and the USB driver on the application processor;
   providing from the USB driver on the application processor to the second USB driver on the audio DSP a device descriptor; and
   at the second USB driver, using the device descriptor passed from the USB driver to perform data transfers.

4. The method of claim 3, further comprising responding to audio control data from the USB endpoint with the application processor.

5. The method of claim 3, further comprising processing human interface device (HID) commands with the USB driver on the application processor.

6. The method of claim 5, wherein processing the HID commands comprises processing volume up, volume down, play, pause, mute, unmute, and stop.

7. A system on a chip (SoC), comprising:
   a system bus;
   Universal Serial Bus (USB) B) hardware;
   a USB connector communicatively coupled to the USB hardware and configured to couple to an external digital USB peripheral;
   an application processor communicatively coupled to the USB hardware through the system bus, the application processor comprising a USB host driver; and
   a second processor communicatively coupled to the USB hardware through the system bus, the second processor comprising a second USB driver;
   wherein the application processor is configured to enumerate and set up a USB endpoint through the USB hardware and the USB connector and pass data about the USB endpoint to the second processor such that the second processor may pass digital packets to the USB hardware.

8. A method of controlling a Universal Serial Bus (USB) endpoint, comprising:
   enumerating a USB endpoint with a USB driver on an application processor;
   receiving a request from a second USB driver on a second processor to enable or disable a multimedia data stream;
   responsive to the request, enabling or disabling a selected multimedia interface using control endpoints and the USB driver on the application processor;
   providing, from the USB driver on the application processor to the second USB driver on the second processor, a device descriptor; and
   at the second USB driver, using the device descriptor passed from the USB driver to perform data transfers.

* * * * *